United States Patent
Chen et al.

(10) Patent No.: US 10,955,980 B2
(45) Date of Patent: Mar. 23, 2021

(54) TERMINAL AND METHOD FOR TOUCHSCREEN INPUT CORRECTION

(71) Applicant: Huawei Technologies Co., Ltd., Shenzhen (CN)

(72) Inventors: Hao Chen, Nanjing (CN); Bifeng Tong, Nanjing (CN); Xiaoxiao Chen, Nanjing (CN); Minghui Jiang, Shanghai (CN); Jianbo Guo, Shenzhen (CN); Jie Xu, Shanghai (CN); Aihua Zheng, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/343,305

(22) PCT Filed: Sep. 22, 2017

(86) PCT No.: PCT/CN2017/102957
§ 371 (c)(1),
(2) Date: Apr. 18, 2019

(87) PCT Pub. No.: WO2018/082411
PCT Pub. Date: May 11, 2018

(65) Prior Publication Data
US 2019/0258380 A1 Aug. 22, 2019

(30) Foreign Application Priority Data
Nov. 3, 2016 (CN) .......................... 201610956250.1

(51) Int. Cl.
*G06F 3/044* (2006.01)
*G06F 3/041* (2006.01)
*G06F 3/0488* (2013.01)

(52) U.S. Cl.
CPC .......... *G06F 3/0446* (2019.05); *G06F 3/0418* (2013.01); *G06F 3/0488* (2013.01); *G06F 3/04186* (2019.05)

(58) Field of Classification Search
CPC ...... G06F 1/1643; G06F 1/169; G06F 1/1692; G06F 3/03547; G06F 3/041–0428;
(Continued)

(56) References Cited

U.S. PATENT DOCUMENTS

2011/0285645 A1* 11/2011 Cho ..................... G06F 3/0416
345/173
2013/0201160 A1 8/2013 Ito et al.
(Continued)

FOREIGN PATENT DOCUMENTS

CN 101194221 A 6/2008
CN 103246415 A 8/2013
(Continued)

OTHER PUBLICATIONS

Machine Translation and Abstract of Chinese Publication No. CN105824559, Aug. 3, 2016, 30 pages.
(Continued)

*Primary Examiner* — Sanghyuk Park
(74) *Attorney, Agent, or Firm* — Conley Rose, P.C.

(57) ABSTRACT

A method and a terminal for false touch prevention. The method includes determining a type of a touch operation performed on a touchscreen by a user, correcting a false touch point in a doubtful touch operation based on an occurrence process of a screen point touch event in the doubtful touch operation and a preset determining policy when the touch operation is a doubtful touch operation, and reporting the corrected false touch point.

20 Claims, 16 Drawing Sheets

(58) Field of Classification Search
CPC .......... G06F 3/0488–04886; G06F 2200/1634; G06F 2203/0339; G06F 2203/04101–04113
See application file for complete search history.

(56) References Cited

U.S. PATENT DOCUMENTS

| | | | |
|---|---|---|---|
| 2013/0207913 A1 | 8/2013 | Takashima et al. | |
| 2013/0222287 A1 | 8/2013 | Bae et al. | |
| 2013/0265269 A1 | 10/2013 | Sharma et al. | |
| 2014/0204059 A1 | 7/2014 | Geaghan | |
| 2014/0267104 A1 | 9/2014 | Ahmed et al. | |
| 2015/0338954 A1 | 11/2015 | Yang et al. | |
| 2016/0077650 A1 | 3/2016 | Durojaiye et al. | |
| 2016/0224179 A1 | 8/2016 | Ichihara et al. | |
| 2016/0266674 A1 | 9/2016 | Schropp, Jr. | |
| 2016/0283026 A1* | 9/2016 | Koike | G06F 3/04842 |
| 2016/0342275 A1 | 11/2016 | Fu et al. | |
| 2016/0357434 A1* | 12/2016 | Kang | G06F 3/04886 |
| 2018/0011600 A1* | 1/2018 | Li | G06F 3/04886 |

FOREIGN PATENT DOCUMENTS

| | | |
|---|---|---|
| CN | 104407793 A | 3/2015 |
| CN | 104635985 A | 5/2015 |
| CN | 104714704 A | 6/2015 |
| CN | 105824559 A | 8/2016 |
| CN | 106060219 A | 10/2016 |
| CN | 108021259 A | 5/2018 |
| CN | 108463792 A | 8/2018 |
| JP | 2013175139 A | 9/2013 |
| JP | 2014123327 A | 7/2014 |
| JP | 2014528137 A | 10/2014 |
| JP | 2015087933 A | 5/2015 |
| JP | 2016081237 A | 5/2016 |
| JP | 2016517101 A | 6/2016 |
| JP | 2016143349 A | 8/2016 |
| JP | 2016524764 A | 8/2016 |
| WO | 2018082411 A1 | 5/2018 |

OTHER PUBLICATIONS

Machine Translation and Abstract of Chinese Publication No. CN104714704, Jun. 17, 2015, 17 pages.
Machine Translation and Abstract of Chinese Publication No. CN108021259, May 11, 2018, 50 pages.
Machine Translation and Abstract of International Publication No. WO2018082411, May 11, 2018, 57 pages.
Foreign Communication From a Counterpart Application, Chinese Application No. 201610956250.1, Chinese Office Action dated Jul. 1, 2019, 6 pages.
Foreign Communication From a Counterpart Application, Chinese Application No. 201780006355.3, Chinese Office Action dated May 30, 2019, 6 pages.
Foreign Communication From a Counterpart Application, PCT Application No. PCT/CN2017/102957, English Translation of International Search Report dated Jan. 4, 2018, 2 pages.
Foreign Communication From a Counterpart Application, PCT Application No. PCT/CN2017/102957, English Translation of Written Opinion dated Jan. 4, 2018, 4 pages.
Machine Translation and Abstract of Chinese Publication No. CN106060219, Oct. 26, 2016, 17 pages.
Foreign Communication From a Counterpart Application, European Application No. 17866914.9, Extended European Search Report dated Sep. 13, 2019, 12 pages.

* cited by examiner

TERMINAL AND METHOD FOR TOUCHSCREEN INPUT CORRECTION

CROSS-REFERENCE TO RELATED APPLICATIONS

This application is a U.S. National Stage of International Patent Application No. PCT/CN2017/102957 filed on Sep. 22, 2017, which claims priority to Chinese Patent Application No. 201610956250.1 filed on Nov. 3, 2016, Both of the aforementioned applications are hereby incorporated by reference in their entireties.

TECHNICAL FIELD

The present invention relates to the field of touch technologies, and in particular, to a method for false touch prevention and a terminal.

BACKGROUND

With continuous development of science and technology, terminals such as smartphones and personal digital assistants (English: Personal Digital Assistant, PDA) are having increasingly large touchscreens with increasingly narrow frames, to improve user experience when a user edits a short message service message, makes a call, or performs another operation on the terminal.

As the touchscreen of the terminal has a narrow frame, when the user holds the terminal with a hand, skin of the user placed at an edge of the touchscreen may touch the touchscreen to generate a touch instruction unintended by the user, that is, a false touch. As a result, the operation of the user such as message editing or call making on the terminal is interrupted. To avoid this problem, in the prior art, a corresponding method for false touch prevention is usually used to shield a false touch operation without performing any processing, to ensure that the terminal operation proceeds properly.

However, determining a false touch operation by using the prior-art method for false touch prevention is relatively simple. While a false touch operation is shielded, usually an actually useful touch operation accompanying the false touch operation is also shielded, resulting in accidental killing of the touch operation and degrading user experience.

SUMMARY

This application provides a method for false touch prevention and a terminal, to resolve a prior-art problem of accidental killing of a touch operation.

To achieve the foregoing objective, this application uses the following technical solutions.

According to a first aspect, an embodiment of the present invention provides a method for false touch prevention, where the method may be applied to a terminal provided with a touchscreen, and the method may include:
  determining a type of a touch operation performed on the touchscreen by a user; and if determining that the touch operation is a doubtful touch operation, correcting a false touch point in the doubtful touch operation based on an occurrence process of a screen point touch event in the doubtful touch operation and a preset determining policy, and reporting the corrected false touch point.
Correcting the false touch point may mean: performing determining on the false touch point again to finally determine whether the false touch point is a false touch point or a useful touch point when the touch operation ends, and if the original false touch point is re-determined to be a useful touch point, reporting the touch point for processing by an application layer of the terminal.

In this way, analysis, determining, and correction are performed for a touch point corresponding to each event in a screen point touch event procedure, so as to finally determine a false touch point and a useful touch point in the screen point touch event. A touch point that is originally mistaken for a false touch point is corrected, and the corrected false touch point is reported. This avoids accidental killing of all touch points in a suspicious false touch operation, and improves user experience.

With reference to the first aspect, in a feasible implementation of the first aspect, for a touch operation determined to be a false touch operation or a useful touch operation, the following processing may be further performed:
  if determining that the touch operation is a false touch operation, shielding the touch operation without performing any processing; or if determining that the touch operation is a useful touch operation, executing an application corresponding to the touch operation.
All touch points corresponding to a screen point touch event of a false touch operation are false touch points, and all touch points corresponding to a screen point touch event of a useful touch operation are useful touch points.

Shielding a false touch operation means: skipping touch point reporting from the start touch point of the screen point touch event until the touch operation ends.

Executing an application corresponding to a useful touch operation means: reporting, to an application layer of the terminal, touch points one by one based on the occurrence sequence of the events in the screen point touch event of the touch operation; determining, by the application layer based on a moving track of received touch points, a touch gesture corresponding to the touch points; and executing the application corresponding to the touch gesture, where the application corresponding to the touch gesture may be executed by querying a correspondence between touch gestures and applications.

It should be noted that, for the executing an application corresponding to a useful touch operation, whether to execute the application corresponding to the operation may be further determined based on duration of the touch operation. Generally, if a hold time of the useful touch operation is relatively long, the useful touch operation is also shielded with no processing. For example, the user performs a touch and hold operation on a screen central region on the touchscreen, and although the operation is determined to be a useful touch operation through the foregoing determining, a corresponding application may not be triggered because the hold time is relatively long.

Therefore, the false touch operation may be shielded, to prevent the terminal from recognizing the false touch operation and executing the corresponding application, and further avoid affecting an ongoing application on the terminal. In addition, a useful touch operation is reported in time for processing, for an application corresponding to the useful touch operation to respond.

With reference to the first aspect or the foregoing feasible implementation of the first aspect, in a feasible implementation of the first aspect, the terminal may determine, in the following manner, the type of the touch operation performed on the touchscreen by the user:
  obtaining a start touch point with which the user starts to touch the touchscreen, and determining, based on a touch shape of the start touch point and/or coordinates of the start touch point, the type of the touch operation performed on the touchscreen by the user.

The determining based on a touch shape of the start touch point and/or the coordinates of the start touch point may include three cases: determining based on the touch shape of the start touch point, determining based on the coordinates of the start touch point, and determining based on the touch shape of the start touch point and the coordinates of the start touch point.

Optionally, in the feasible implementation, the touchscreen may detect in real time the touch operation performed on the touchscreen by the user. When a finger of the user falls onto the touchscreen, capacitance values in some regions in a capacitance array on the touchscreen change immediately. In this case, a region whose capacitance value continuously changes may be enclosed as the touch shape of the start touch point, coordinates of a centroid position of the region are used as the coordinates of the start touch point on the touchscreen, and the touch shape and the coordinates of the start touch point are reported to the processor of the terminal. Alternatively, the touchscreen directly reports, to the processor of the terminal, contiguous regions in which changes of capacitance values are detected, and the processor determines the touch shape and the coordinates of the start touch point based on the reported information, and further determines the type of the current touch operation of the user based on the touch shape and the coordinates of the start touch point.

It should be noted that, the touchscreen may be a capacitive touchscreen. When the touchscreen in this specification is another type of touchscreen, another manner may be used to detect a status of the touch operation of the user. In addition, a detection result is not limited to the touch shape and the coordinates of the touch point, and the manner of determining the type of the touch operation is also not limited to determining the type based on the touch shape and the coordinates of the touch point.

It should be noted that, the operation falling onto the touchscreen detected by the touchscreen of the mobile phone may be a touch operation made by a finger of the user, or may be a touch operation made by the user by using another auxiliary tool (a device such as a stylus). This is not limited in the embodiments of the present invention. In the present invention, only the touch operation made by a finger of the user is used as an example for description.

With reference to the feasible implementation of the first aspect, in another feasible implementation of the first aspect, determining, based on the touch shape of the start touch point and/or the coordinates of the start touch point, the touch operation of the user as a false touch operation, or a useful touch operation, or a doubtful touch operation is specifically implemented as follows:

(1) False Touch Operation

If the touch shape of the start touch point is tangent to a first side of the touchscreen, and a length of a tangent side is greater than or equal to a first threshold, the touch operation is determined to be a false touch operation; or if the touch shape of the start touch point is tangent to both a first side and a second side of the touchscreen, and a sum of a length of a first tangent side and a length of a second tangent side is greater than or equal to a second threshold, the touch operation is determined to be a false touch operation, where the length of the first side is greater than the length of the second side; or if the coordinates of the touch point corresponding to the start touch point are within a false touch region, the touch operation is determined to be a false touch operation.

The length of the first side is greater than the length of the second side. The first side may be a longitudinal side of the touchscreen of the mobile phone, and the second side may be a latitudinal side of the touchscreen of the mobile phone. It may be understood that, the longitudinal side and the latitudinal side of the touchscreen depend on actual sizes of edges of the touchscreen. Generally, a longer edge of the touchscreen is referred to as the longitudinal side, and a shorter edge of the touchscreen is referred to as the latitudinal side.

That the touch shape of the touch point is tangent to a side (the first side or the second side) of the touchscreen of the mobile phone may mean that there is one or two intersection points between the touch shape of the touch point and the side of the touchscreen of the mobile phone. When there is one intersection point between the touch shape of the touch point and the side of the touchscreen of the mobile phone, a length between the intersection point and a vertex of the side of the touchscreen of the mobile phone in the touch shape is used as the length of the tangent side. For example, there is one intersection point between a point P1 shown in FIG. 6 and the longitudinal side of the touchscreen of the mobile phone, and a distance LY between the intersection point and a vertex of the longitudinal side in the P1 is used as the length of the tangent side. When there are two intersection points between the touch shape of the touch point and the side of the touchscreen of the mobile phone, a length between the two intersection points is used as the length of the tangent side.

The first threshold and the second threshold may be thresholds that are set based on a research conducted with respect to touch shapes occurring when most users make false touches and that are pre-stored in the mobile phone, and specific values of the first threshold and the second threshold are not limited in the present invention. If the length of the tangent side corresponding to the touch operation is greater than or equal to the threshold, it indicates that the touch operation is a false touch operation. In addition, setting the first threshold and the second threshold further needs to consider a resolution of the mobile phone and a size of the touchscreen of the mobile phone. Different resolutions and different sizes of the touchscreen may be corresponding to different thresholds. Generally, a higher resolution and a larger size of the touchscreen indicate a lager first threshold and a larger second threshold, and a lower resolution and a smaller size of the touchscreen indicate a smaller first threshold and a smaller second threshold.

(2) Useful Touch Operation

If the touch shape of the start touch point is not tangent to any side of the touchscreen, the touch operation is determined to be a useful touch operation; or if the coordinates of the start touch point are within a valid touch region, the touch operation is determined to be a useful touch operation.

(3) Doubtful Touch Operation

If the touch shape of the start touch point is tangent to a first side of the touchscreen, and a length of a tangent side is less than a first threshold, the touch operation is determined to be a doubtful touch operation; or if the touch shape of the start touch point is tangent to both a first side and a second side of the touchscreen, and a sum of a length of a first tangent side and a length of a second tangent side is less than a second threshold, the touch operation is determined to be a doubtful touch operation, where the first tangent side is a side obtained after the touch shape of the start touch point is tangent to the first side, and the second tangent side is a side obtained after the touch shape of the start touch point is tangent to the second side; or if it is determined, based on the start touch point, that the user is holding the terminal with one hand, the touch operation is determined to be a doubtful touch operation; or if an operation corresponding to the start touch point is a thenar touch operation, the touch operation is determined to be a doubtful touch operation; for example, if the touch shape of the start touch point is a shape occurring after a thenar of the user presses the touchscreen, the start touch point is determined to be a thenar touch point; or if an operation corresponding to the start touch point is a diagonal thenar touch operation, the touch operation is determined to be a doubtful touch operation; for example, if the touch shape of the start touch point is a shape occurring after a thenar of the user presses the touchscreen, and the start touch point is at a lower left part or a lower right part of the touchscreen, the start touch point is determined to be a diagonal thenar touch point.

In this way, it can be determined, according to the determining principle, whether the touch operation of the user is a false touch operation, a useful touch operation, or a doubtful touch operation.

It should be noted that, in the present invention, the touch operation may include at least one screen point touch event, and each screen point touch event may include a down event, at least one move event, and an up event. A touch point corresponding to the down event may be referred to as a start touch point, a touch point corresponding to the move event may be referred to as an intermediate touch point, and a touch point corresponding to the up event may be referred to as an end touch point.

With reference to any one of the first aspect or the feasible implementations of the first aspect, in another feasible implementation of the first aspect, when analyzing each screen point touch event in the doubtful touch operation, the terminal may first obtain a start touch point corresponding to a down event; determine whether the start touch point is a false touch point (for example, an edge touch point or a diagonal thenar touch point); and if the start touch point is not a false touch point, determine that the current touch operation is a useful touch operation, and report the start touch point, an intermediate touch point corresponding to a subsequently-obtained move event, and an end touch point corresponding to an up event. Otherwise, after obtaining any intermediate touch point, the terminal determines a distance between the intermediate touch point and the start touch point; corrects a determining result about the start touch point based on the distance between the two points or based on the distance between the two points and another auxiliary touch point; and if determining that the start touch point is not a false touch point, reports the start touch point, an intermediate touch point corresponding to a subsequently-obtained move event, a shielded intermediate touch point before the intermediate touch point, and an end touch point corresponding to an up event. By a time when the terminal obtains an up event, if the start touch point still remains a false touch point, the terminal determines an occurrence time difference between the end touch point and the start touch point; corrects a determining result about the start touch point based on the occurrence time difference between the two points; and if determining that the start touch point is not a false touch point, reports the start touch point and the end touch point.

Alternatively, the terminal obtains a start touch point corresponding to a down event; if the start touch point is a thenar touch point, determines that the start touch point is a false touch point; obtains any intermediate touch point; determines whether the intermediate touch point is a thenar touch point; if yes, shields the intermediate touch point, or otherwise, determines whether the intermediate touch point is a suspicious thenar touch point; if the intermediate touch point is not a suspicious thenar touch point, determines that the start touch point is not a false touch point, reports the start touch point and a shielded intermediate touch point before the intermediate touch point, obtains an end touch point in the screen point touch event, and determines whether the end touch point is a thenar touch point; and if the end touch point is a thenar touch point, shields the end touch point, or otherwise, reports the end touch point.

Specifically, the terminal may use in the following manner to correct a false touch point in a doubtful touch operation based on a preset determining policy and an occurrence process of a screen point touch event in an edge false touch, a diagonal thenar false touch, or a thenar false touch in the doubtful touch operation, and report the corrected false touch point.

(1) Edge False Touch

The terminal obtains a down event corresponding to the screen point touch event; and if a start touch point corresponding to the down event is an edge touch point, determines that the start touch point is a false touch point, or otherwise, determines that the start touch point is a useful touch point, and directly reports the start touch point;

obtains any one of at least one move event in the screen point touch event; and if the start touch point is not a false touch point, reports an intermediate touch point corresponding to the move event, or if the start touch point is a false touch point, determines whether a distance between an intermediate touch point corresponding to the move event and the start touch point is greater than a first distance threshold, and if determining that the distance is greater than the first distance threshold, determines that the start touch point is not a false touch point, and reports the start touch point, the intermediate touch point, and a shielded intermediate touch point before the intermediate touch point, or otherwise, shields the intermediate touch point; and obtains an up event corresponding to the screen point touch event; and if the start touch point is not a false touch point, reports an end touch point; or if the start touch point still remains a false touch point in this case, determines whether an occurrence time difference between an end touch point corresponding to the up event and the start touch point is less than a first time threshold, and if determining that the occurrence time difference is less than the first time threshold, determines that the start touch point is not a false touch point, and reports the start touch point and the end touch point, or otherwise, shields the end touch point to end the touch event there.

Specifically, correcting a false touch point in the doubtful touch operation based on the occurrence process of the screen point touch event in the doubtful touch operation and the preset determining policy, and reporting the corrected false touch point may include:

The terminal obtains the down event in the screen point touch event, determines whether the start touch point corresponding to the down event is an edge touch point, and if determining that the start touch point is not an edge touch point, reports the down event, or if determining that the start touch point is an edge touch point, which indicates that the start touch point is a false touch point, skips reporting the down event, and records an identifier of the screen point touch event corresponding to the start touch point into a false touch (English: False Touch, FT) record array;

the terminal obtains the move event in the screen point touch event, determines whether the start touch point is a false touch point, and if determining that the start touch point is not a false touch point, reports the move event, or if determining that the start touch point is a false touch point, determines whether a distance between an intermediate touch point and a start touch point is greater than a first distance threshold; and if the distance between the intermediate touch point and the start touch point is greater than the first distance threshold, which indicates that the touch operation spans a relatively large distance and is probably a useful touch operation, and that the start touch point is mistaken, the terminal determines that the start touch point is a useful touch point (in other words, not a false touch point), deletes the identifier of the screen point touch event from the FT record array, and reports the move event, the down event, and a shielded move event before the move event; or if the distance between the intermediate touch point and the start touch point is less than or equal to the first distance threshold, determines that the start touch point still remains a false touch point, shields the move event, and stores the move event into a resend array; and the terminal obtains the up event in the screen point touch event, determines whether the start touch point is a false touch point, and if determining that the start touch point is not a false touch point, reports the up event, or if determining that the start touch point is a false touch point, determines whether the occurrence time difference between the end touch point and the start touch point is less than a first time threshold; and if determining that the occurrence time difference between the end touch point and the start touch point is less than the first time threshold, which indicates that the touch operation is a tap event and probably a useful touch operation, and that the start touch point is mistaken, the terminal determines that the start touch point is a useful touch point (in other words, not a false touch point), deletes the identifier of the screen point touch event from the FT record array, and reports the move event and the up event; or if determining that the occurrence time difference between the end touch point and the start touch point is greater than or equal to the first time threshold, determines that the start touch point still remains a false touch point, shields the up event, deletes the identifier of the screen point touch event from the FT record array to end the current screen point touch event.

In this way, based on the occurrence procedure of the screen point touch event corresponding to the edge touch operation, a touch point corresponding to each event in the procedure may be analyzed. An earlier-occurring touch point that is mistaken is corrected based on a touch status of a later-occurring touch point. This avoids accidental killing of a touch point in the edge touch operation, and improves user experience.

(2) Diagonal Thenar False Touch

The terminal obtains a down event in the screen point touch event; and if a start touch point corresponding to the down event is a diagonal thenar touch point, determines that the start touch point is a false touch point, and shields the start touch point, or otherwise, reports the start touch point;

obtains any one of at least one move event in the screen point touch event; and if the start touch point is not a false touch point, reports an intermediate touch point corresponding to the move event, or if the start touch point is a false touch point, queries whether an auxiliary touch point exists on the touchscreen within an occurrence time from the start touch point to an intermediate touch point corresponding to the move event, and if no auxiliary touch point exists, determines that the start touch point is not a false touch point, and reports the start touch point, the intermediate touch point, and a shielded intermediate touch point before the intermediate touch point;

if an auxiliary touch point exists, determines whether a distance of a first tangent side between the intermediate touch point and the start touch point is greater than a first tangent side distance threshold, and whether a distance of a second tangent side between the intermediate touch point and the start touch point is greater than a second tangent side distance threshold;

if determining that the distance of the first tangent side is greater than the first tangent side distance threshold, and that the distance of the second tangent side is greater than the second tangent side distance threshold, determines that the start touch point is not a false touch point, and reports the start touch point, the intermediate touch point, and a shielded intermediate touch point before the intermediate touch point; or otherwise, determines whether an average value of a length of the first tangent side of the intermediate touch point and a length of a first tangent side of an intermediate touch point before the intermediate touch point is greater than a tangent side length threshold;

if the average value is greater than the tangent side length threshold, determines that the start touch point is a false touch point; or otherwise, determines that the start touch point is not a false touch point, and reports the start touch point, the intermediate touch point, and a shielded intermediate touch point before the intermediate touch point; and obtains an up event corresponding to the screen point touch event; and if the start touch point is not a false touch point in this case, reports an end touch point corresponding to the up event, or if the start touch point is a false touch point, determines whether an occurrence time difference between an end touch point corresponding to the up event and the start touch point is less than a second time threshold, and if determining that the occurrence time difference is less than the second time threshold, determines that the start touch point is not a false touch point, and reports the start touch point and the end touch point, or otherwise, shields the end touch point to end the current touch operation.

Specifically, that the terminal corrects a false touch point in the doubtful touch operation based on the occurrence process of the screen point touch event in the doubtful touch operation and the preset determining policy, and reports the corrected false touch point may include:

The terminal obtains the down event in the screen point touch event, determines whether the start touch point corresponding to the down event is a diagonal thenar touch point, and if determining that the start touch point is not a diagonal thenar touch point, reports the down event, or if determining that the start touch point is a diagonal thenar touch point, which indicates that the start touch point is a false touch point, skips reporting the down event, and records an identifier of the screen point touch event corresponding to the start touch point into an FT record array;

the terminal obtains the move event in the screen point touch event, determines whether the start touch point is a false touch point, and if determining that the start touch point is not a false touch point, reports the move event, or if determining that the start touch point is a false touch point, queries whether an auxiliary touch point exists on the touchscreen within a preset occurrence time from the start touch point to the intermediate touch point;

if no auxiliary touch point exists, the terminal determines that the start touch point is mistaken, determines that the start touch point is a useful touch point (in other words, not a false touch point), deletes the identifier of the screen point touch event from the FT record array, and reports the move event, the down event, and a shielded move event before the move event; or if an auxiliary touch point exists, determines whether the distance of the first tangent side between the intermediate touch point and the start touch point is greater than the first tangent side distance threshold, and whether the distance of the second tangent side between the intermediate touch point and start touch point is greater than the second tangent side distance threshold;

if the distance of the first tangent side between the intermediate touch point and the start touch point is greater than the first tangent side distance threshold, and the distance of the second tangent side between the intermediate touch point and the start touch point is greater than the second tangent side distance threshold, which indicates that the touch operation spans a relatively large distance and is probably a useful touch operation, and that the start touch point is mistaken, the terminal deletes the identifier of the screen point touch event from the FT record array, and reports the move event, and the down event, and the shielded move event before the move event; or if the distance of the first tangent side between the intermediate touch point and the start touch point is less than or equal to the first tangent side distance threshold and/or the distance of the second tangent side between the intermediate touch point and the start touch point is less than or equal to the second tangent side distance threshold, determines whether the average value of the length of the first tangent side of the intermediate touch point and the length of the first tangent side of an intermediate touch point before the intermediate touch point is greater than the tangent side length threshold;

if the average value is greater than the tangent side length threshold, the terminal shields the move event, and stores the move event into a resend array; or if the average value is less than or equal to the tangent side length threshold, which indicates that the start touch point is mistaken, deletes the identifier of the screen point touch event from the FT record array, and reports the move event, the down event, and the shielded move event before the move event;

the terminal obtains the up event in the screen point touch event, determines whether the start touch point is a false touch point, and if determining that the start touch point is not a false touch point, reports the up event, or if determining that the start touch point is a false touch point, determines whether the occurrence time difference between the end touch point and the start touch point is less than the second time threshold; and if determining that the occurrence time difference between the end touch point and the start touch point is less than the second time threshold, which indicates that the touch operation is a tap event and probably a useful touch operation, and that the start touch point is mistaken, the terminal determines that the start touch point is a useful touch point (in other words, not a false touch point), deletes the identifier of the screen point touch event from the FT record array, and reports the move event and the up event; or if determining that the occurrence time difference between the end touch point and the start touch point is greater than or equal to the first time threshold, determines that the start touch point still remains a false touch point, shields the up event, deletes the identifier of the screen point touch event from the FT record array to end the current screen point touch event.

In this way, based on the occurrence procedure of the screen point touch event corresponding to the diagonal thenar touch point, a touch point corresponding to each event in the procedure may be analyzed. An earlier-occurring touch point that is mistaken is corrected based on a touch status of a later-occurring touch point. This avoids accidental killing of a touch point in a diagonal thenar operation, and improves user experience.

(3) Thenar False Touch

The terminal obtains a down event in the screen point touch event; and if a start touch point corresponding to the down event is a thenar touch point, determines that the start touch point is a false touch point, and shields the start touch point, or otherwise, reports the start touch point;

obtains any one of at least one move event in the screen point touch event; determines whether an intermediate touch point corresponding to the move event is a thenar touch point; and if the intermediate touch point is a thenar touch point, shields the intermediate touch point, or if determining that the intermediate touch point is not a thenar touch point, determines whether the intermediate touch point is a suspicious thenar touch point, and if the intermediate touch point is not a suspicious thenar touch point, determines that the start touch point is not a false touch point, and reports start touch point, the intermediate touch point, and a shielded intermediate touch point before the intermediate touch point; and obtains an up event corresponding to the screen point touch event; determines whether an end touch point corresponding to the up event is a thenar touch point; and if the end touch point is not a thenar touch point, reports the end touch point, or otherwise, shields the end touch point to end the touch operation.

Specifically, that the terminal corrects a false touch point in the doubtful touch operation based on the occurrence process of the screen point touch event in the doubtful touch operation and the preset determining policy, and reports the corrected false touch point may include:

The terminal obtains the down event in the screen point touch event, determines whether the start touch point corresponding to the down event is a thenar touch point, and if determining that the start touch point is not a thenar touch point, reports the down event, or if determining that the start touch point is a thenar touch point, which indicates that the start touch point is a false touch point, skips reporting the down event, and records coordinates corresponding to the start touch point;

the terminal obtains the move event in the screen point touch event, determines whether the intermediate touch point is a thenar touch point, and if determining that the intermediate touch point is a thenar touch point, which indicates that determining that the start touch point is a false touch point is correct, and shields the move event without using a regret mechanism; or if determining that the intermediate touch point is not a thenar touch point, which indicates that determining that the start touch point is a thenar touch point may be incorrect, and in this case, determines whether the intermediate touch point is a suspicious thenar touch point;

if the intermediate touch point is a suspicious thenar touch point, which indicates that determining that the start touch point is a thenar touch point is correct, the terminal shields the move event without using a regret mechanism, and stores the move event into a resend array; or if the intermediate touch point is not a suspicious thenar touch point, which indicates that determining that the start touch point is a thenar touch point is incorrect, and that the start touch point is mistaken, determines that the start touch point is a useful touch point (in other words, not a false touch point), and reports the move event, the down event, and the shielded move event before the move event; and the terminal obtains the up event in the screen point touch event, determines whether the end touch point corresponding to the up event is a thenar touch point, and if determining the end touch point as a thenar touch point, reports the up event, or if determining that the end touch point is not a thenar touch point, shields the up event to end the current screen point touch event.

In this way, based on the occurrence procedure of the screen point touch event corresponding to the thenar touch point, a touch point corresponding to each event in the procedure may be analyzed. An earlier-occurring touch point that is mistaken is corrected based on a touch status of a later-occurring touch point. This avoids accidental killing of a touch point in a thenar operation, and improves user experience.

According to a second aspect, a terminal is provided, where the terminal may include a touchscreen, an obtaining unit, a reporting unit, a determining unit, and a processing unit; where the obtaining unit is configured to obtain a touch operation performed on the touchscreen by a user;

the reporting unit is configured to report the touch operation to the determining unit;

the determining unit is configured to: receive the touch operation reported by the reporting unit, and determine a type of the touch operation performed on the touchscreen by the user; and the processing unit is configured to: if the determining unit determines that the touch operation is a doubtful touch operation, correct a false touch point in the doubtful touch operation based on an occurrence process of a screen point touch event in the doubtful touch operation and a preset determining policy, and report the corrected false touch point.

According to a third aspect, a terminal is provided, where the terminal may include a touchscreen and a processor; where the touchscreen is configured to: obtain a touch operation performed on the touchscreen by a user, and report the touch operation to the processor; and the processor is configured to: receive the touch operation reported by the touchscreen; determine a type of the touch operation performed on the touchscreen by the user; and if determining that the touch operation is a doubtful touch operation, correct a false touch point in the doubtful touch operation based on an occurrence process of a screen point touch event in the doubtful touch operation and a preset determining policy, and report the corrected false touch point.

According to a fourth aspect, a non-volatile computer-readable storage medium storing one or more programs is provided, where the one or more programs include instructions which, if executed by the terminal described in any one of the second aspect, the third aspect, or the feasible implementations, cause the terminal to execute the following events:

determining a type of a touch operation performed on a touchscreen by a user; and if determining that the touch operation is a doubtful touch operation, correcting a false touch point in the doubtful touch operation based on an occurrence process of a screen point touch event in the doubtful touch operation and a preset determining policy, and reporting the corrected false touch point.

For specific implementations of the second aspect, the third aspect, and the fourth aspect, refer to the behavior functions of the terminal in the method for false touch prevention provided in any one of the first aspect or the feasible implementations of the first aspect. Details are not described herein again. In addition, the terminal provided in the second aspect, the third aspect, and the fourth aspect can achieve the same beneficial effects as in the first aspect.

DESCRIPTION OF EMBODIMENTS

A basic principle of the embodiments of the present invention is: A touchscreen of a terminal receives a touch operation of a user, performs preliminary analysis and determining on the touch operation of the user, and determines that the touch operation of the user is a touch operation unintended by the user (for example, an operation that the user touches the touchscreen unintentionally, where such a touch operation may be referred to as a false touch operation), or a touch operation made by the user when the user intends to execute an application (in other words, a useful touch operation), or a doubtful touch operation. If the touch operation is a doubtful touch operation, the terminal considers an event procedure of each screen point touch event in the touch operation, performs analysis and determining on a touch point corresponding to each event in the event procedure, shields a false touch point in the current touch operation, and retains a useful touch point for further processing. Retaining the useful touch point while excluding the false touch point in the doubtful touch operation avoids accidental killing of all touch points in the doubtful false touch operation, and improves user experience.

The following clearly describes the technical solutions in the embodiments of the present invention with reference to the accompanying drawings in the embodiments of the present invention. The described embodiments are merely a part rather than all of the embodiments of the present invention. All other embodiments obtained by persons of ordinary skill in the art based on the embodiments of the present invention without creative efforts shall fall within the protection scope of the present invention.

Before the solutions are described in detail, for ease of understanding the technical solutions of the present invention, some key terms in the present invention are explained in detail. It should be noted that, the following terms are so named by persons skilled in the art name merely for ease of description, and do not mean or imply that related systems or elements need to be named in this way. Therefore, these names do not constitute any limitation on the present invention.

Figure 1:
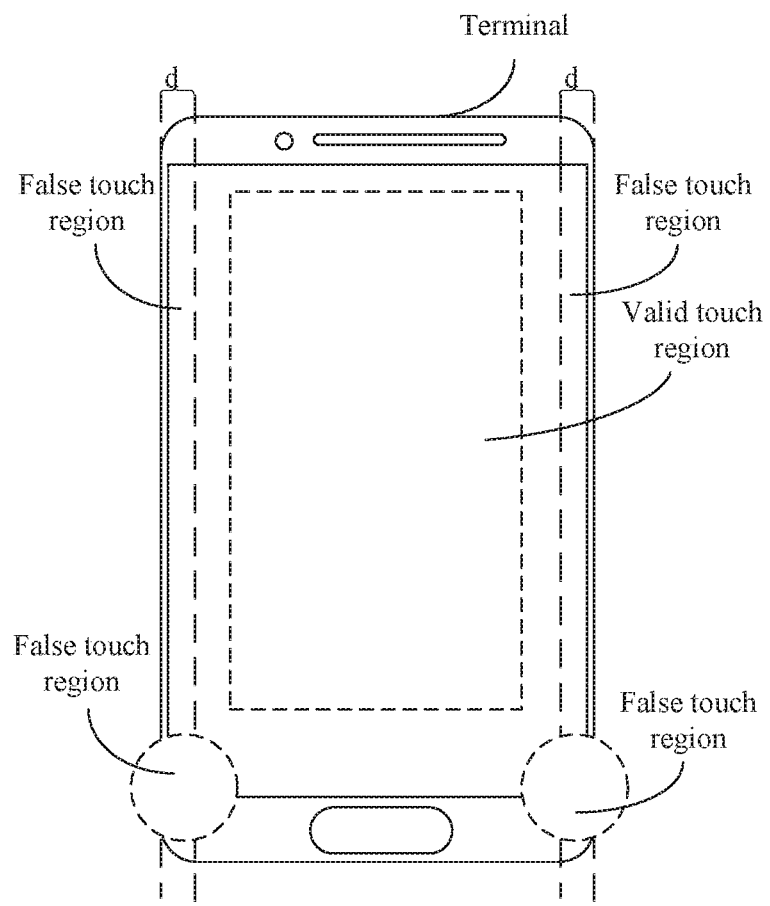
FIG. 1 is a schematic diagram of a false touch region and a valid touch region.

False touch region: a region that a user unintentionally touches on a touchscreen of a terminal, causing interruption of a mobile phone application. Generally, this region is a region that a finger of the user is usually not likely to tap. There may be one or more false touch regions on the touchscreen. For example, as shown in FIG. 1, the false touch region may be one or more of relatively narrow edge regions (for example, a region with a width d) at two sides of the terminal, a lower left region of the terminal, and a lower right region of the terminal.

Valid touch region: a region touched by the user to trigger an application on the terminal. Generally, the region may be a central region of the touchscreen of the terminal, as shown in FIG. 1. It should be noted that, a size of the valid touch region may be a size of the touchscreen that is scaled down according to a proportion, or may be a system-preset fixed shape, or may be any user-drawn enclosed pattern. There may be one or more valid touch regions on the touchscreen.

Touch operation: an operation that a finger of the user presses the touchscreen of the terminal or an operation that a finger of the user moves on the touchscreen of the terminal according to a preset track. Most touch operations are implemented by moving a finger. Some movements are unobvious (usually, it is not easy for the user to see with naked eye the moving of the finger on the touchscreen in this touch operation, and the user can only intuitively be aware that the touch operation includes two actions that the finger falls onto the touchscreen and that the finger lifts from the touchscreen), and some movements are obvious, and the touch operation has a moving track with a significant move distance. Generally, a touch operation corresponding to one finger of the user may be used as one screen point touch event. In this way, each touch operation may include one or more screen point touch events depending on different touch operations of the user. When only one screen point touch event is included, the touch operation may be referred to as a single touch operation, and when a plurality of screen point touch events are included, the touch operation may be referred to as a multi-point touch operation.

Screen point touch event: may be a process in which a finger of the user falls onto and moves on the touchscreen until a touch point of the finger disappears from the touchscreen. Generally, based on an event occurrence time, a screen point touch event may sequentially include: a down event that the finger falls onto the touchscreen, several intermediate move events, and an up event that the finger lifts from the touchscreen. Each event may be corresponding to one touch point, and the touch points may be at a same position or different positions. In the embodiments of the present invention, depending on different events occurring in the screen point touch event, touch points corresponding to different events occurring may be named differently. For example, a touch point corresponding to the down event may be referred to as a start touch point, a touch point corresponding to the move event may be referred to as an intermediate touch point, and a touch point corresponding to the up event may be referred to as an end touch point. When the touch operation is a useful touch operation, a driving module at a bottom layer of the terminal may report the events sequentially to a processor of the terminal based on an occurrence sequence of the events in the screen point touch event.

Figure 2A:
FIG. 2A is a schematic event flowchart of a single screen point touch event.

For example, as shown in FIG. 2a, in a single touch operation (for example, only a screen point touch event P1 occurs on the touchscreen), the driving module may report, in a sequence of down event→move event→ . . . →move event→up event, the events to the processor of the terminal for processing.

Figure 2B:
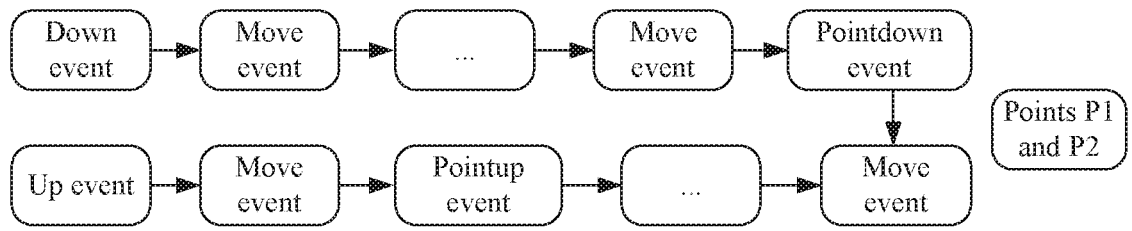
FIG. 2B is a schematic event flowchart of a plurality of screen point touch events.

As shown in FIG. 2b, in a multi-point touch operation (for example, a screen point touch event including points P1 and P2 occurs on the touchscreen), the driving module may report events in the following sequence. When a first touch point falls onto the touchscreen, the driving module reports a down event; when a new touch point falls onto the touchscreen, the driving module reports a pointdown event; when the touch point and the new touch point move, the driving module sequentially reports move events according to an occurrence time sequence of the events; and when one touch point lifts from the touchscreen, the driving module reports a pointup event, and when a last touch point lifts from the touchscreen, the driving module reports an up event.

Touch point: In the embodiments of the present invention, a press region formed on the touchscreen after one finger of the user presses the touchscreen of the terminal may be referred to as a touch point.

False touch operation: an operation performed when the user unintentionally touches the touchscreen of the terminal. Generally, a touch shape of a start touch point of such a touch operation is irregular, and the touch shape exceeds a threshold. In other words, the touch shape does not conform to a touch size of a normal touch of a user. Generally, an irregular operation performed by the user on the false touch region may be considered as a false touch operation.

Useful touch operation: a touch operation made by the user to trigger an application on the terminal. Generally, a touch shape of a start touch point of such a touch operation is relatively regular, and a size of the touch shape is within a normal range.

Doubtful touch operation: an operation that cannot be easily determined, based on an initial touch shape or coordinates of the touch operation, to be a false touch operation or a useful touch operation. Generally, a touch shape of a start touch point of such a touch operation is relatively regular, but a size of the touch shape exceeds a normal range; or a touch shape of a start touch point of such a touch operation is irregular, but a size of the touch shape is within a threshold, that is, the size conforms to a touch size of a normal touch of a user.

Figure 3A:
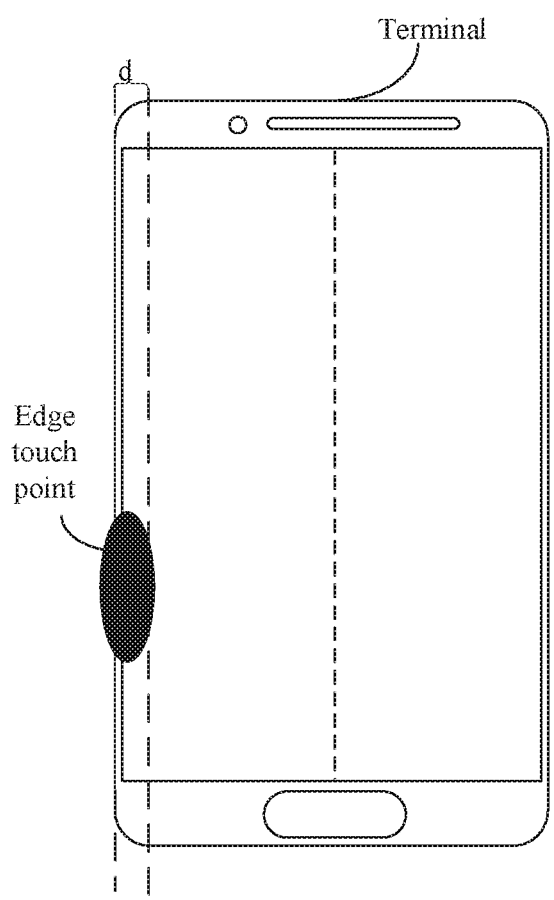
FIG. 3A is a schematic diagram of an edge touch point.

Edge touch point: a touch point formed when the user presses an edge region of the touchscreen of the terminal. The edge region of the touchscreen may be a set of points from which a distance to a longitudinal side of the touchscreen is less than or equal to a distance threshold. The distance threshold may be dynamically set based on a resolution of the terminal and a size of the touchscreen. Generally, the distance threshold may be set to a relatively small value, for example, a distance d shown in FIG. 3a, where a touch point within the region d is an edge touch point.

Figure 3B:
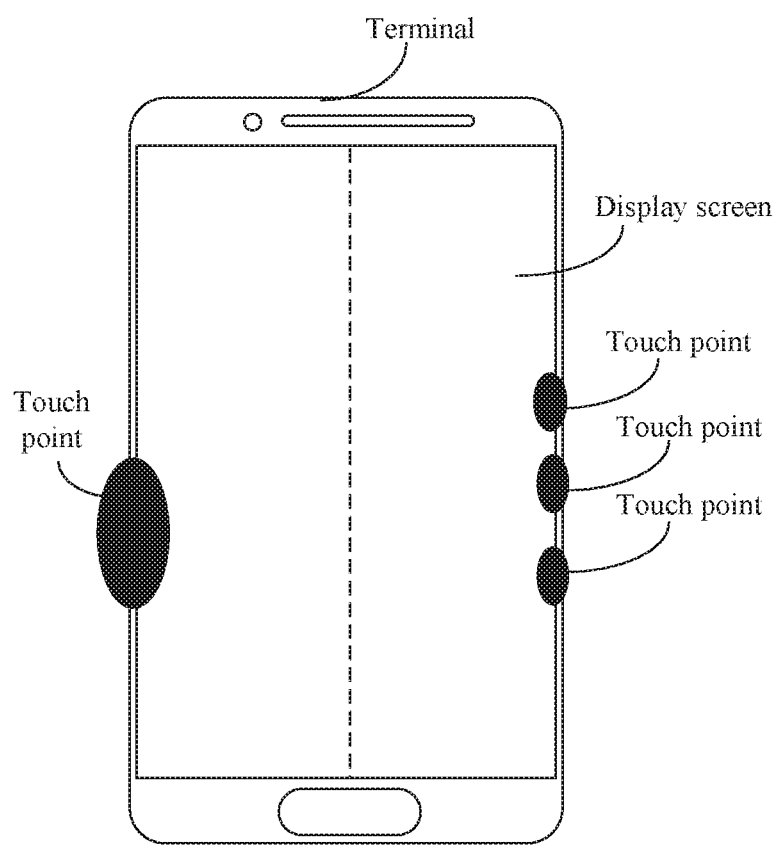
FIG. 3B is a schematic diagram of holding a terminal with one hand.

Holding the terminal with one hand: A user holds the terminal with the left hand or the right hand. In other words, the user presses the touchscreen of the terminal with several fingers of the left hand or the right hand of the user, for example, as shown in FIG. 3b.

Figure 3C:
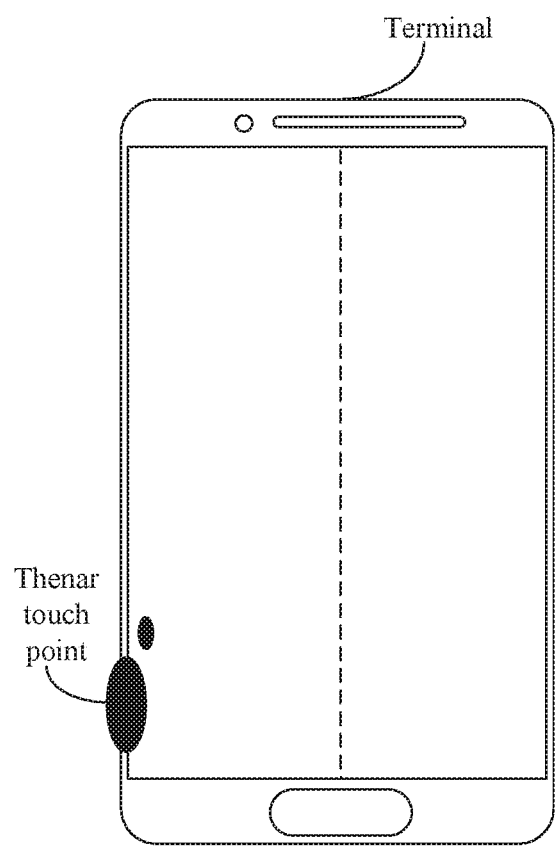
FIG. 3C is a schematic diagram of a thenar touch point.

Thenar touch point: a touch point formed when a part, on a user palm from a base of a thumb to a base of the palm, that is obvious eminent when the palm is expanded (that is, a thenar) presses the touchscreen of the terminal, for example, a touch point shown in FIG. 3c.

Figure 3D:
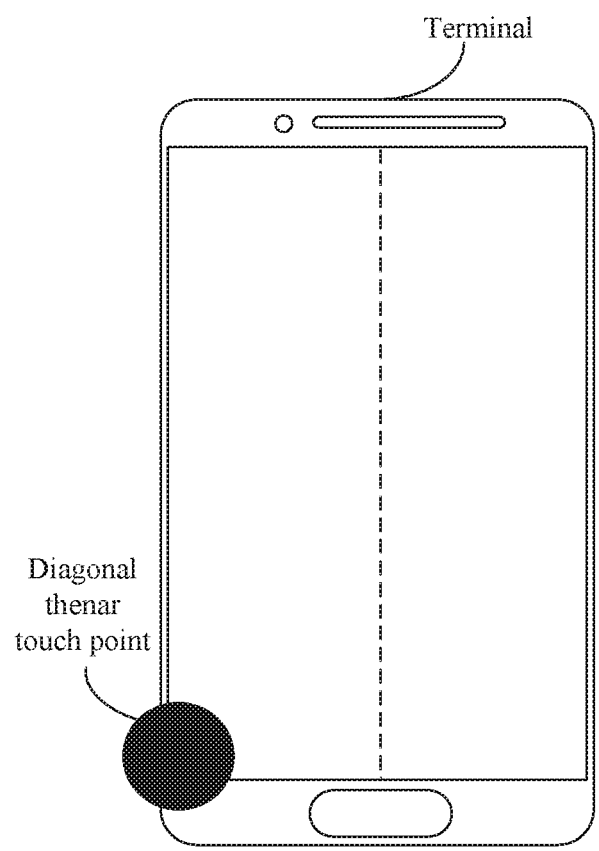
FIG. 3D is a schematic diagram of a diagonal thenar touch point.

Diagonal thenar touch point: a touch point formed when a part, on a user palm from a base of a thumb to a base of the palm, that is obvious eminent when the palm is expanded (that is, a thenar) presses a lower left part or a lower right part the touchscreen of the terminal. A corner near the bottom of the terminal may be referred to as the lower left part, and the other corner near the bottom may be referred to as the lower right part. For example, a diagonal thenar touch point at the lower left part of the touchscreen is shown in FIG. 3d.

The method for false touch prevention provided in the embodiments of the present invention is applied to a frameless or narrow-frame terminal provided with a touchscreen. The terminal may be a terminal device such as a mobile phone, a tablet computer, a notebook computer, a UMPC (English: Ultra-mobile Personal Computer, ultra-mobile personal computer), a netbook, or a PDA. Specifically, in the embodiments of the present invention, the terminal being a mobile phone is used as an example to describe the method for false touch prevention provided in the present invention.

The following describes each constituent component of the mobile phone 10 in detail with reference to an accompanying drawing.

Figure 4:
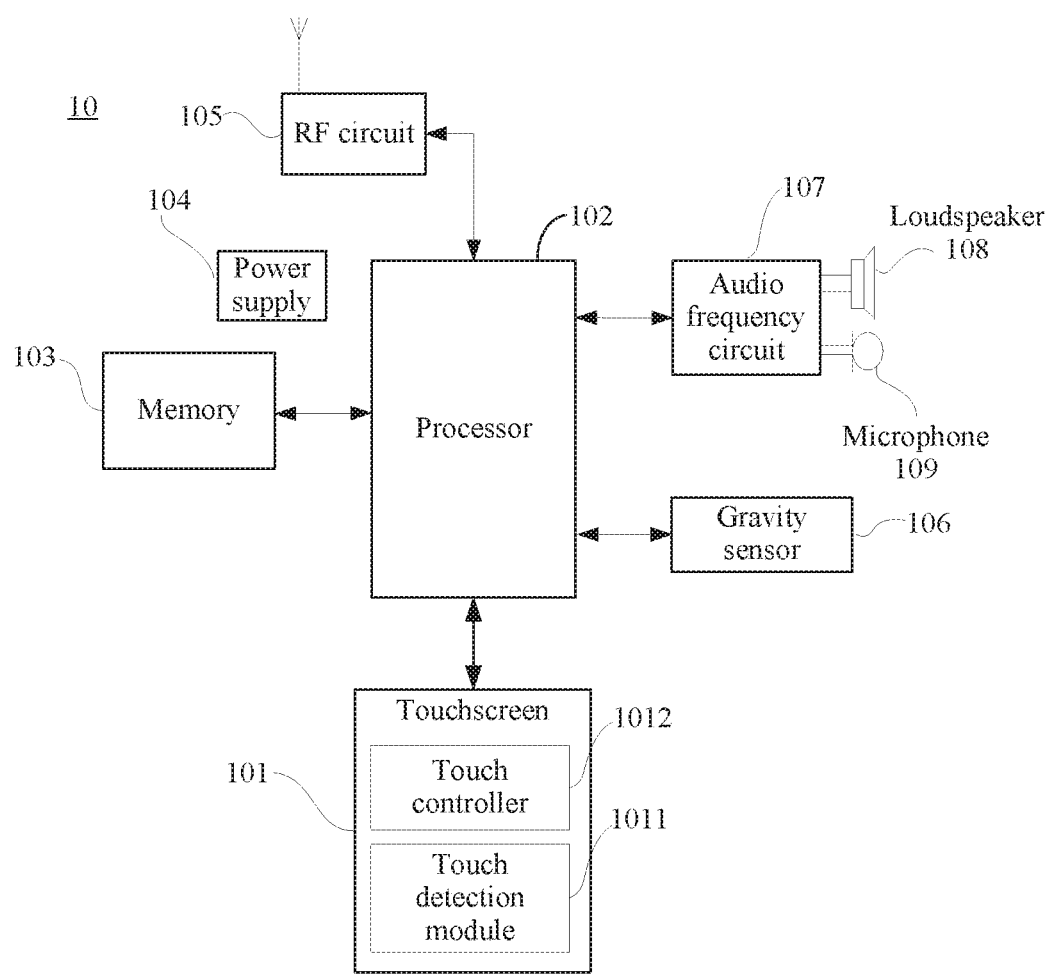
FIG. 4 is a schematic structural diagram of a terminal according to an embodiment of the present invention.

As shown in FIG. 4, the mobile phone 10 may include components such as a touchscreen 101, a processor 102, a memory 103, a power supply 104, a radio frequency (English: Radio Frequency, RF) circuit 105, a gravity sensor 106, an audio frequency circuit 107, a loudspeaker 108, and a microphone 109. These components may be connected by using a bus, or may be connected directly. Persons skilled in the art may understand that the mobile phone structure shown in FIG. 4 does not constitute a limitation on the mobile phone, and the mobile phone may include more components than those shown in the diagram, or some components may be combined, or the components may be disposed in different manners.

Figure 4A:
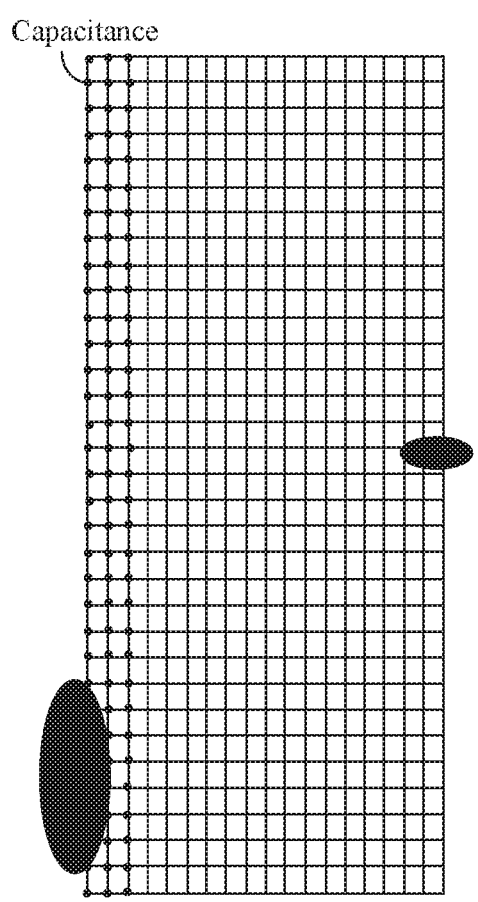
FIG. 4a is a schematic structural diagram of a touchscreen of a terminal.

The touchscreen 101, or referred to as a touch display panel, is configured to implement input and output functions of the mobile phone 10, capable of collecting a touch operation performed by a user on or near the touchscreen 101 (such as an operation performed by the user on or near the touchscreen 101 by using any proper object or accessory such as a finger or a stylus), and driving a corresponding connection apparatus according to a preset program, and may be further configured to display information entered by the user, or information provided to the user (for example, an image collected by using a camera), and various menus of the mobile phone. Optionally, the touchscreen 101 may be implemented in various types, such as a resistive type, a capacitive type, an infrared type, and a surface acoustic wave type. This is not limited in the embodiments of the present invention. The present invention only uses a capacitive-type touchscreen shown in FIG. 4a as an example for description. The capacitive-type touchscreen may include a capacitance matrix. When a finger touches the touchscreen, a capacitance at a touch position changes with different levels of pressing force of the finger.

Specifically, the touchscreen 101 may include a touch detection module 1011 and a touch controller 1012. The touch detection module 1011 may detect values, a shape, a quantity, and a distribution status of capacitances whose capacitance value changes on the touchscreen 101, and send a detection result to the touch controller. The touch controller 1012 receives the detection result from the touch detection module 1011, determines, based on the detection result, a status of pressing the touchscreen 101 by the finger of the user, and sends the status of pressing the touchscreen 101 by the finger of the user to the processor 102, to determine a type of a touch operation.

The processor 102 is a control center of the mobile phone 10, uses various interfaces and lines to connect all components of the entire mobile phone, and executes various functions and processes data of the mobile phone 10 by running or executing software programs and/or modules stored in the memory 103 and calling data stored in the memory 103, to perform overall monitoring on the mobile phone 10. Optionally, the processor 102 may include one or more processing units. Preferably, an application processor and a modulation and demodulation processor may be integrated into the processor 102. The application processor processes mainly an operating system, user interfaces, applications, and the like, and the modulation and demodulation processor processes mainly radio communication. It may be understood that, the modulation and demodulation processor may alternatively not be integrated into the processor 102.

Specifically, in the embodiments of the present invention, the processor 102 may receive a pressing status of a finger on the touchscreen 101 that is sent by the touchscreen 101, and determine, based on the pressing status of the finger on the touchscreen 101, whether a touch operation of a user is a false touch operation, a useful touch operation, or a doubtful touch operation. If the touch operation is a doubtful touch operation, the processor considers an event procedure of each screen point touch event in the touch operation, performs analysis and determining on a touch point in each screen point touch event in the event procedure, corrects, based on a distance relationship or a time relationship between adjacent touch points, a touch point that has been determined to be a false touch point, shields a false touch point, and reports a useful touch point.

It may be understood that, in the embodiments of the present invention, in another feasible implementation, the touchscreen 101 may be further configured to determine, based on the pressing status of the finger, whether the touch operation of the user is a false touch operation, a useful touch operation, or a doubtful touch operation. If the touch operation is a doubtful touch operation, the touchscreen 101 reports the doubtful touch operation to the processor 102, and the processor 102 performs further processing. For example, the processor 102 considers an event procedure of each screen point touch event in the touch operation, performs analysis and determining on a touch point in each screen point touch event in the event procedure, corrects, based on a distance relationship or a time relationship between adjacent touch points, a touch point that has been determined to be a false touch point, shields a false touch point, and reports a useful touch point.

The memory 103 may be configured to store data, a software program, and a module. The memory 103 may be a volatile memory (English: volatile memory) such as a random access memory (English: random-access memory, RAM), or a non-volatile memory (English: non-volatile memory) such as a read-only memory (English: read-only memory, ROM), a flash memory (English: flash memory), a hard disk drive (English: hard disk drive, HDD), or a solid-state drive (English: solid-state drive, SSD), or a combination of the foregoing types of memories. Specifically, the memory 103 may store program code, and the processor 102 executes the program code, to execute the method for false touch prevention provided in the embodiments of the present invention.

The power supply 104 may be a battery, logically connected to the processor 102 by using a power management system, so that functions such as charging and discharging management and power consumption management are implemented by using the power management system.

The RF circuit 105 may be configured to receive and send information, or receive and send signals in a call process, and particularly, send received information to the processor 102 for processing, and send a signal generated by the processor 102. Usually, the RF circuit includes but is not limited to an antenna, at least one amplifier, a transceiver, a coupler, a low noise amplifier (English: Low Noise Amplifier, LNA), a duplexer, and the like. In addition, the RF circuit 105 may also communicate with a network and other devices via radio communication.

The gravity sensor (gravity sensor) 106 may detect a magnitude of an acceleration of the mobile phone in each direction (usually three axes), and in a stationary state, may detect a magnitude and a direction of gravity, and is applicable to applications for recognizing mobile phone postures (for example, shift between a landscape orientation and a portrait orientation, related games, and magnetometer posture calibration), and vibration recognition-related functions (such as a pedometer and knocking) and the like. It should be noted that, the mobile phone 10 may further include other sensors, such as an optical sensor, a gyroscope, a barometer, a hygrometer, a thermometer, and an infrared sensor. Details are not described herein.

The audio frequency circuit 107, the loudspeaker 108, and the microphone 109 may provide an audio interface between the user and the mobile phone 10. The audio frequency circuit 107 may transform received audio data into an electrical signal, and transmit the electrical signal to the loudspeaker 108, and the loudspeaker 108 transforms the electrical signal into a sound signal for output. In addition, the microphone 109 transforms a collected sound signal into an electrical signal, and the audio frequency circuit 107 receives the electrical signal and transforms it into audio data, and then outputs the audio data to the RF circuit 105, so that the audio data is sent to, for example, another mobile phone, or the audio frequency circuit 107 outputs the audio data to the memory 102 for further processing.

Although not shown, the mobile phone 10 may further include a wireless fidelity (English: wireless fidelity, WiFi) module, a Bluetooth module, a camera, and other functional modules, which are not described one by one herein.

Figure 5:
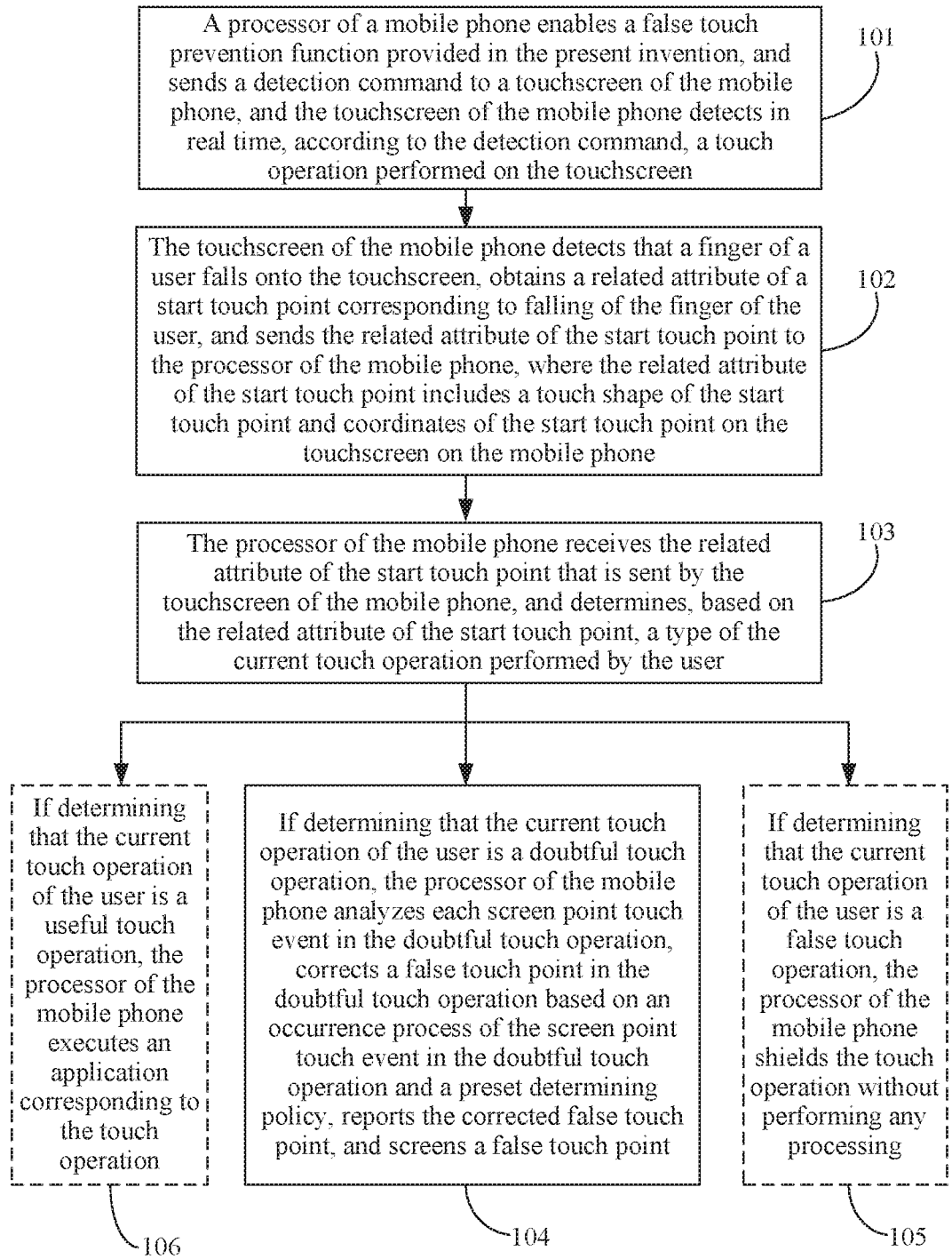
FIG. 5 is a flowchart of a method for false touch prevention according to an embodiment of the present invention.

To make the objectives, technical solutions, and advantages of the present invention clearer, with reference to the specific components of the mobile phone 10 shown in FIG. 4, the following describes the method for false touch prevention provided in the embodiments of the present invention with reference to a flowchart of the method for false touch prevention shown in FIG. 5. The shown steps may also be performed by using any terminal other than the mobile phone shown in FIG. 4. In addition, although a logic sequence of the steps of the method for false touch prevention provided in the present invention is shown in the method flowchart, in some occasions, the shown or described steps may be performed in a sequence different from the sequence herein.

A mobile phone manufacturer or a developer of a false touch prevention application may conduct a research about behaviors of a large quantity of users in using mobile phones (for example, which regions the users usually unintentionally touch on the touchscreen to interrupt a mobile phone application, which regions the users usually touch on the touchscreen to trigger a mobile phone application, and a user-finger pressing status on the touchscreen when a mobile phone application is interrupted as a result an unintentional touch of the user on the touchscreen). If it is found that, when most users use mobile phones, a mobile phone application is interrupted when a finger touches a narrower edge region on either side of the mobile phone, or a lower left region of the mobile phone, or a lower right region of the mobile phone, that users usually touch a central region of the touchscreen of the mobile phone when performing a touch operation to trigger an application on the mobile phone, and that a fingerprint shape occurring with pressing on the touchscreen of the mobile phone in a false touch by a finger exceeds a threshold, it is determined that regions such as the narrower edge regions on both sides of the mobile phone, or the lower left region of the mobile phone, or the lower right region of the mobile phone are false touch regions, that the central region of the touchscreen of the mobile phone is a valid touch region, and that a touch operation with the fingerprint pressing shape exceeding the threshold is a false touch operation. The false touch region, the valid touch region, and the threshold are recorded into the memory of the mobile phone, or the false touch region, the valid touch region, and the threshold are stored in the false touch prevention application. In another implementation, a user may enter the false touch region, the valid touch region, and the threshold into the mobile phone. For example, the processor of the mobile phone may display a user interface related to the false touch prevention application on the touchscreen of the mobile phone. The user enters the false touch region, the valid touch region, and the threshold into an input box for region and threshold setting on the user interface, and taps a save button on the user interface. The processor of the mobile phone receives the user's operation of tapping the save button, and stores the false touch region, the valid touch region, and the threshold entered by the user into the mobile phone.

Step 101: The processor of the mobile phone enables a false touch prevention function provided in the present invention, and sends a detection command to the touchscreen of the mobile phone, and the touchscreen of the mobile phone detects in real time, according to the detection command, a touch operation performed on the touchscreen.

Optionally, after the processor of the mobile phone detects that the mobile phone is powered on, the processor of the mobile phone automatically enables the false touch prevention function provided in the present invention on the mobile phone. Alternatively, after the processor of the mobile phone receives an operation made by a user for enabling the false touch prevention function provided in the present invention, the processor of the mobile phone enables the false touch prevention function provided in the present invention on the mobile phone.

Optionally, the user may select a corresponding option in menu options of the terminal, to perform the operation of enabling the false touch prevention function provided in the present invention; or perform, by pressing one hardware key or a combination of several hardware keys corresponding to the false touch prevention function, the operation of enabling the false touch prevention function provided in the present invention. This is not limited in the embodiments of the present invention.

Step 102: The touchscreen of the mobile phone detects that a finger of the user falls onto the touchscreen, obtains a related attribute of a start touch point corresponding to falling of the finger of the user, and sends the related attribute of the start touch point to the processor of the mobile phone, where the related attribute of the start touch point includes a touch shape of the start touch point or coordinates of the start touch point on the touchscreen on the mobile phone.

As described above, the touch operation of the user may include one or more screen point touch events. The screen point touch event may be a process in which the finger of the user falls onto and moves on the touchscreen until a touch point of the finger disappears from the touchscreen. To be specific, based on an event occurrence time, the screen point touch event may sequentially include: a down event that the finger falls onto the touchscreen, several intermediate move events, and an up event that the finger lifts from the touchscreen. A touch point corresponding to the down event is referred to as a start touch point, a touch point corresponding to the move event is referred to as an intermediate touch point, and a touch point corresponding to the up event is referred to as an end touch point. Therefore, an event generated when the finger falls exactly onto the touchscreen in step 102 is a down event, and the corresponding touch point is the start touch point.

Optionally, the touchscreen of the mobile phone may detect in time changing of a capacitance value on the touchscreen. If a capacitance value of a capacitance changes, it is determined that a position of the capacitance receives pressing or touching. In this case, a contiguous region whose capacitance value changes may be enclosed as a touch point, a shape of the contiguous region is determined to be the touch shape of the touch point, and coordinates of a centroid of the contiguous region is determined to be the coordinates of the touch point on the touchscreen. An initial value of a capacitance on the touchscreen may be set to 0. If it is detected that the capacitance value of the capacitance is not 0 (for example, greater than 0 or less than 0), it is determined that the capacitance value of the capacitance has changed.

It should be noted that, the operation falling onto the touchscreen detected by the touchscreen of the mobile phone may be a touch operation made by a finger of the user, or may be a touch operation made by the user by using another auxiliary tool (a device such as a stylus). This is not limited in the embodiments of the present invention. In the present invention, only the touch operation made by a finger of the user is used as an example for description.

In actual application, touchscreens of some mobile phones may not be provided with a functional module for processing a detected touch point and determining a touch shape and coordinates of the touch point. Therefore, alternatively, in step 102, after the touchscreen of the mobile phone detects the touch point, the touchscreen may report the detected touch point to the processor of the mobile phone, and the processor of the mobile phone determines the touch shape and the coordinates of the touch point.

Step 103. The processor of the mobile phone receives the related attribute of the start touch point that is sent by the touchscreen of the mobile phone, and determines, based on the related attribute of the start touch point, a type of the current touch operation performed by the user.

The current touch operation of the user may be a touch operation starting from the start touch point. The type of the current touch operation of the user may be any one of a false touch operation, a useful touch operation, and a doubtful touch operation.

Optionally, the processor of the mobile phone may perform analysis and determining on the touch shape and the coordinates of the received start touch point with reference to the false touch region, the valid touch region, and the threshold that are pre-stored into the mobile phone and determining principles of the false touch operation, the useful touch operation, and the doubtful touch operation in (1), (2), and (3), to determine the type of the current touch operation of the user.

(1) False Touch Operation

Figure 6:
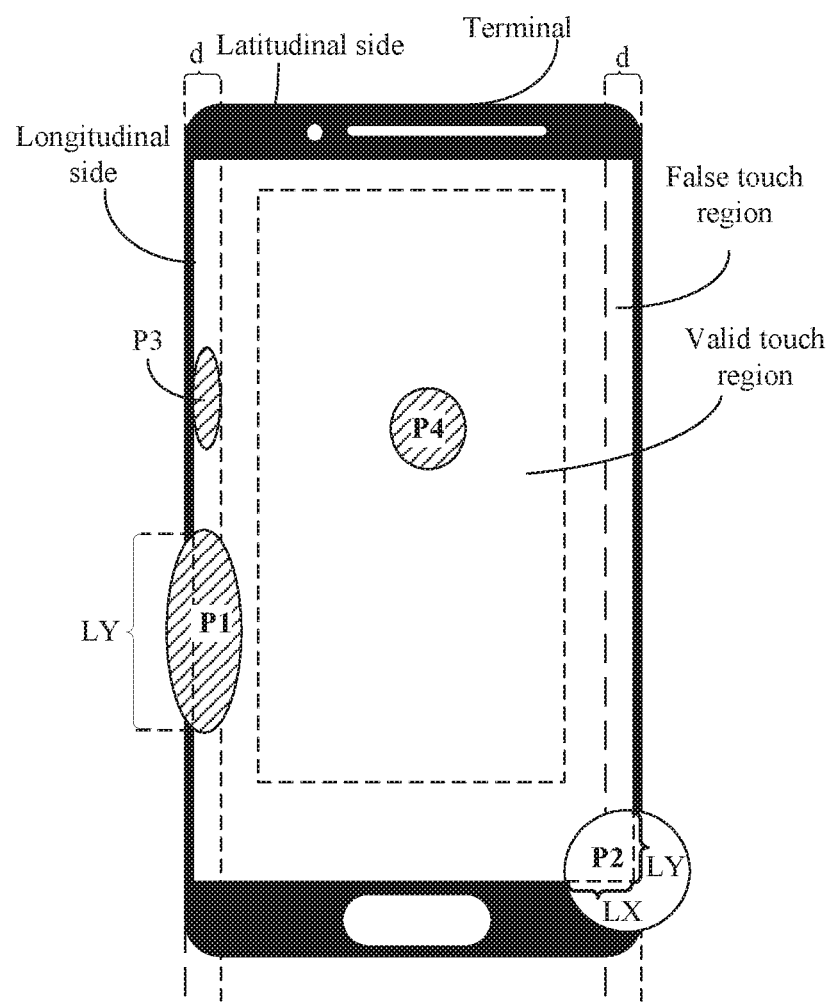
FIG. 6 is a schematic diagram of a touch operation according to an embodiment of the present invention.

If the touch shape of the start touch point of the user is tangent to a first side of the touchscreen of the mobile phone, and a length LY of a tangent side is greater than or equal to a first threshold L1, the current touch operation of the user is determined to be a false touch operation, for example, a point P1 shown in FIG. 6.

If the touch shape of the start touch point of the user is tangent to a first side and a second side of the touchscreen of the mobile phone, and a sum of a length LX of a first tangent side and a length LY of a second tangent side is greater than or equal to a second threshold L2, the current touch operation of the user is determined to be a false touch operation, for example, a point P2 shown in FIG. 6.

If the coordinates of the start touch point of the user are within the false touch region, the current touch operation of the user is determined to be a false touch operation. For example, a point P3 shown in FIG. 6 is within a false touch region with a width d, and therefore the P3 is determined to be a false touch operation.

The length of the first side is greater than the length of the second side. The first side may be a longitudinal side of the touchscreen of the mobile phone, and the second side may be a latitudinal side of the touchscreen of the mobile phone. It may be understood that, the longitudinal side and the latitudinal side of the touchscreen depend on actual sizes of edges of the touchscreen. Generally, a longer edge of the touchscreen is referred to as the longitudinal side, and a shorter edge of the touchscreen is referred to as the latitudinal side.

That the touch shape of the touch point is tangent to aside (the first side or the second side) of the touchscreen of the mobile phone may mean that there is one or two intersection points between the touch shape of the touch point and the side of the touchscreen of the mobile phone. When there is one intersection point between the touch shape of the touch point and the side of the touchscreen of the mobile phone, a length between the intersection point and a vertex of the side of the touchscreen of the mobile phone in the touch shape is used as the length of the tangent side. For example, there is one intersection point between the point P1 shown in FIG. 6 and the longitudinal side of the touchscreen of the mobile phone, and a distance LY between the intersection point and a vertex of the longitudinal side in the P1 is used as the length of the tangent side. When there are two intersection points between the touch shape of the touch point and the side of the touchscreen of the mobile phone, a length between the two intersection points is used as the length of the tangent side. For example, there are two intersection points between the point P2 shown in FIG. 6 and the longitudinal side of the touchscreen of the mobile phone, and a length of between the two intersection points is used as the length of the tangent side.

The first threshold and the second threshold may be thresholds that are set based on a research conducted with respect to touch shapes occurring when most users make false touches and that are pre-stored in the mobile phone, and specific values of the first threshold and the second threshold are not limited in the present invention. If the length of the tangent side corresponding to the touch operation is greater than or equal to the threshold, it indicates that the touch operation is a false touch operation. In addition, setting the first threshold and the second threshold further needs to consider a resolution of the mobile phone and a size of the touchscreen of the mobile phone. Different resolutions and different sizes of the touchscreen may be corresponding to different thresholds. Generally, a higher resolution and a larger size of the touchscreen indicate a lager first threshold and a larger second threshold, and a lower resolution and a smaller size of the touchscreen indicate a smaller first threshold and a smaller second threshold.

(2) Useful Touch Operation

If the touch shape of the start touch point of the user is not tangent to any side of the touchscreen of the mobile phone, or the coordinates of the start touch point are within the valid touch region, the current touch operation of the user is determined to be a useful touch operation. For example, a point P4 shown in FIG. 6 is within the valid touch region, and therefore the P4 is determined to be a useful touch operation.

(3) Doubtful Touch Operation

If the touch shape of the start touch point of the user is tangent to the first side of the touchscreen of the mobile phone, and the length LY of the tangent side is less than the first threshold L1, the current touch operation of the user is determined to be a doubtful touch operation.

If the touch shape of the start touch point of the user is tangent to both the first side and the second side of the touchscreen of the mobile phone, and the sum of the length LX of the first tangent side and the length LY of the second tangent side is less than the second threshold L2, the current touch operation of the user is determined to be a doubtful touch operation.

If it is determined, based on the start touch point of the user, that the user is holding the terminal with one hand, the current touch operation of the user is determined to be a doubtful touch operation. That it is determined, based on the start touch point of the user, that the user is holding the terminal with one hand may include: If there are a plurality of start touch points, and all start touch points are within an edge region of the touchscreen of the mobile phone, it is determined that the user is holding the terminal with one hand. For example, FIG. 3b shows a touch operation that the user holds the mobile phone with one hand.

If the start touch point of the user is a thenar touch point, the current touch operation of the user is determined to be a doubtful touch operation. For example, if the touch shape of the start touch point is a shape occurring after a thenar of the user presses the touchscreen, the start touch point is determined to be a thenar touch point.

If the start touch point of the user is a diagonal thenar touch point, the current touch operation of the user is determined to be a doubtful touch operation. For example, if the touch shape of the start touch point is a shape occurring after a thenar of the user presses the touchscreen, and the start touch point is at a lower left part or a lower right part of the touchscreen, the start touch point is determined to be a diagonal thenar touch point.

Step 104: If determining that the current touch operation of the user is a doubtful touch operation, the processor of the mobile phone analyzes each screen point touch event in the doubtful touch operation, corrects a false touch point in the doubtful touch operation based on an occurrence process of the screen point touch event in the doubtful touch operation and a preset determining policy, reports the corrected false touch point, and shields a false touch point.

The screen point touch event may include a down event, at least one move event, and an up event. A touch point corresponding to the down event may be referred to as a start touch point, a touch point corresponding to the move event may be referred to as an intermediate touch point, and a touch point corresponding to the up event may be referred to as an end touch point. A mistaken point may mean that a touch point that is an actually useful touch point is mistaken for a false touch point.

Optionally, the processor of the mobile phone may first obtain a start touch point corresponding to a down event; determine whether the start touch point is a false touch point (for example, an edge touch point or a diagonal thenar touch point); and if the start touch point is not a false touch point, determine that the current touch operation is a useful touch operation, and report the start touch point, an intermediate touch point corresponding to a subsequently-obtained move event, and an end touch point corresponding to an up event.

Otherwise, after obtaining any intermediate touch point, the processor of the mobile phone determines a distance between the intermediate touch point and the start touch point; corrects a determining result about the start touch point based on the distance between the two points or based on the distance between the two points and another auxiliary touch point; and if determining that the start touch point is not a false touch point, reports the start touch point, an intermediate touch point corresponding to a subsequently-obtained move event, a shielded intermediate touch point before the intermediate touch point, and an end touch point corresponding to an up event.

By a time when the processor of the mobile phone obtains an up event, if the start touch point still remains a false touch point, the processor of the mobile phone determines an occurrence time difference between the end touch point and the start touch point; corrects a determining result about the start touch point based on the occurrence time difference between the end touch point and the start touch point; and if determining that the start touch point is not a false touch point, reports the start touch point and the end touch point.

Alternatively, the processor of the mobile phone obtains a start touch point corresponding to a down event; determines whether the start touch point is a thenar touch point; if the start touch point is a thenar touch point, determines that the start touch point is a false touch point; obtains any intermediate touch point; determines whether the intermediate touch point is a thenar touch point; if yes, shields the intermediate touch point, or otherwise, determines whether the intermediate touch point is a suspicious thenar touch point; if the intermediate touch point is not a suspicious thenar touch point, determines that the start touch point is not a false touch point, reports the start touch point and a shielded intermediate touch point before the intermediate touch point, obtains an end touch point in the screen point touch event, and determines whether the end touch point is a thenar touch point; and if the end touch point is a thenar touch point, shields the end touch point, or otherwise, reports the end touch point.

In this way, the processor of the mobile phone may correct a mistaken point among the edge false touch point, the diagonal thenar false touch point, and the thenar false touch point, so as to retain a useful touch point while excluding a false touch point in a doubtful touch operation. This avoids accidental killing of all touch points among suspicious false touch points, and improves user experience.

Further, the processor of the mobile phone also processes the false touch operation and the useful touch operation. Specifically, as shown in FIG. 5, the method may further include the following steps.

Step 105: If determining that the current touch operation of the user is a false touch operation, the processor of the mobile phone shields the touch operation without performing any processing.

Optionally, the shielding the touch operation without performing any processing if the current touch operation of the user is determined to be a false touch operation may specifically include: skipping reporting the screen point touch event in the current touch operation of the user to an application layer, shielding (ignoring) all touch points in the screen point touch event without performing any processing.

Step 106: If determining that the current touch operation of the user is a useful touch operation, the processor of the mobile phone executes an application corresponding to the touch operation.

For example, the executing an application corresponding to the touch operation if determining that the current touch operation of the user is a useful touch operation may specifically include: reporting a down event, a subsequent move event, and an up event that are corresponding to the screen point touch event in the current touch operation of the user one by one to an application layer of the mobile phone based on the event occurrence sequence. The application layer of the mobile phone determines a gesture of the current touch operation of the user based on a moving track of touch points corresponding to these events, and executes the corresponding mobile phone application based on the gesture.

It should be noted that, for the executing an application corresponding to a useful touch operation, whether to execute the application corresponding to the operation may be further determined based on duration of the touch operation. Generally, if a hold time of the useful touch operation is relatively long, the useful touch operation is also shielded with no processing. For example, the user performs a touch and hold operation on a screen central region on the touchscreen, and although the operation is determined to be a useful touch operation through the foregoing determining, a corresponding application may not be triggered because the hold time is relatively long.

Therefore, while the application corresponding to the useful touch operation is executed correctly with false touch prevention, a false touch point in a doubtful touch operation can be excluded and a useful touch point can be retained. This avoids accidental killing of all touch points among suspicious false touch points, and improves user experience.

Specifically, for any screen point touch event in a doubtful touch operation, the present invention may use procedures shown in FIG. 7A to FIG. 9C to correct a false touch point in the doubtful touch operation, report the corrected false touch point, and shield a false touch point.

Figure 7A:
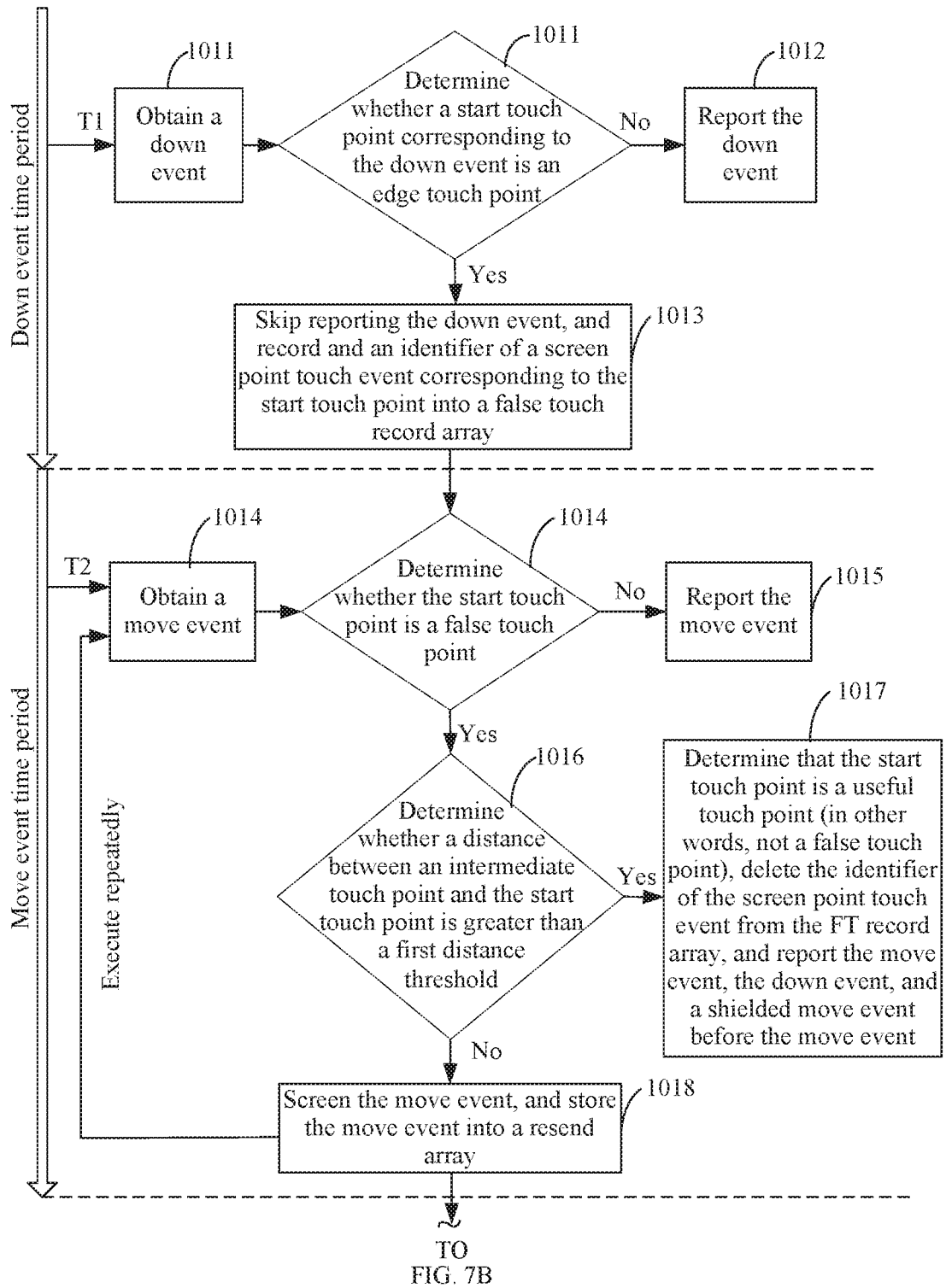
FIG. 7A and FIG. 7B are an analysis flowchart of false edge touch prevention according to an embodiment of the present invention.
Figure 7B:
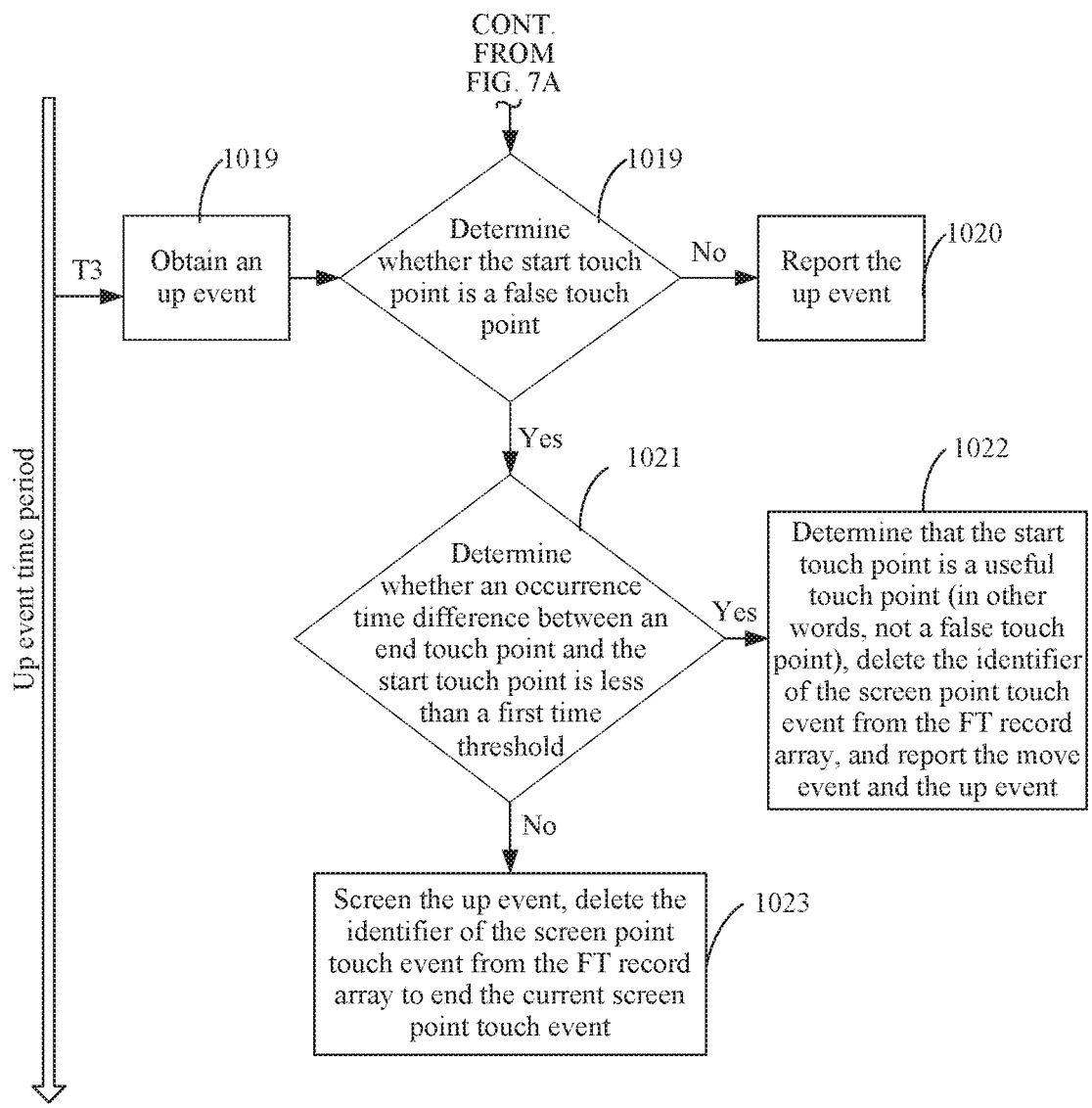

FIG. 7A and FIG. 7B are an analysis flowchart of false edge touch prevention according to an embodiment of the present invention. As shown in FIG. 7A and FIG. 7B, this may include the following steps.

Step 1011: A processor of a mobile phone obtains a down event in a screen point touch event, and determines whether a start touch point corresponding to the down event is an edge touch point.

Optionally, it may be checked whether coordinates of the start touch point are included within an edge region of a touchscreen of the mobile phone; and if included, the start touch point is determined to be an edge touch point, or if not included, the start touch point is determined not to be an edge touch point.

The edge region of the touchscreen of the mobile phone may be a set of points from which a vertical distance to a longitudinal side of the touchscreen is less than or equal to a preset edge region width SideL. The edge region width SideL may be dynamically configured based on a size of a current touch point and a mobile phone application.

Specifically, the SideL may make the following equation true:

$$\text{Side}L=\text{Func}(\text{Lenth})+\text{application modification coefficient, or Side}L=\text{Func}(\text{Lenth})*\text{application modification coefficient}.$$

Herein, Lenth is a length of a tangent side of the touch point that is currently detected whether the touch point is an edge touch point. Generally, the tangent side may be a tangent side obtained when a touch shape of the touch point is tangent to the longitudinal side of the touchscreen. Func (Lenth) is a function whose variable is the length of the tangent side. The application modification coefficient may be set depending on different mobile phone applications, with different mobile phone applications corresponding to different application modification coefficients.

Step 1012: If the start touch point is determined not to be an edge touch point, report the down event.

Reporting the down event may specifically include: reporting the start touch point corresponding to the down event to an application layer of the processor of the mobile phone for processing, which may include: reporting that the start touch point is a useful point (that is, a normal point), and executing original processing logic of a system. Therefore, in this embodiment of the present invention, reporting the down event may mean reporting the start touch point. Likewise, reporting a move event may mean reporting an intermediate touch point, and reporting an up event may mean reporting an end touch point.

Step 1013: If the start touch point is determined to be an edge touch point, which indicates that the start touch point is a false touch point, skip reporting the down event, and record an identifier of a screen point touch event corresponding to the start touch point into a false touch (English: False Touch, FT) record array.

The identifier of the screen point touch event is used to identify the screen point touch event.

Optionally, an occurrence time of the start touch point, and the coordinates of the start touch point may be further recorded into the FT record array.

Step 1014: The processor of the mobile phone obtains a move event in the screen point touch event, and determines whether the start touch point is a false touch point.

The move event may be any move event in the screen point touch event.

Optionally, identifiers of screen point touch events recorded into the FT record array may be queried. If the identifier of the screen point touch event corresponding to the move event is included, the start touch point corresponding to the down event in the current screen point touch event is determined to be a false touch point, or otherwise, the start touch point is determined not to be a false touch point.

Step 1015: If the start touch point is determined not to be a false touch point, report the move event.

A process of reporting the move event is the same as the process of reporting the down event in step 1012, and details are not described herein again.

Step 1016: If the start touch point is determined to be a false touch point, determine whether a distance between an intermediate touch point and the start touch point is greater than a first distance threshold.

The first distance threshold may be dynamically configured based on the size of the current touch point and the mobile phone application. Specifically, the first distance threshold DistanceL may make the following equation true:

$$\text{Distance}L = \text{Func(Lenth)} + \text{application modification coefficient, or Distance}L = \text{Func(Lenth)} * \text{application modification coefficient.}$$

Herein, Lenth is a length of a tangent side of the touch point that is currently detected. Generally, the tangent side may be a tangent side obtained when a touch shape of the touch point is tangent to the longitudinal side of the touchscreen. Func(Lenth) is a function whose variable is the length of the tangent side. The application modification coefficient may be set depending on different mobile phone applications, with different mobile phone applications corresponding to different application modification coefficients.

Step 1017: If the distance between the intermediate touch point and the start touch point is greater than the first distance threshold, which indicates that the touch operation spans a relatively larger distance and is probably a useful touch operation, and that the start touch point is mistaken, determine that the start touch point is a useful touch point (in other words, not a false touch point), delete the identifier of the screen point touch event from the FT record array, and report the move event, the down event, and a shielded move event before the move event.

The shielded move event before the move event may be a move event occurring earlier than the move event.

Optionally, a resend (Resend) array may be searched for the shielded move event before the move event.

Step 1018: If the distance between the intermediate touch point and the start touch point is less than or equal to the first distance threshold, determine that the start touch point still remains a false touch point, shield the move event, and store the move event into a resend array.

It should be noted that, each time when obtaining a move event, the processor of the mobile phone needs to perform steps 1014 to 1018, until the end of all move events. In other words, when receiving an up event sent by the touchscreen of the mobile phone, the processor of the mobile phone performs step 1019.

Step 1019: The processor of the mobile phone obtains an up event corresponding to the screen point touch event, and determines whether the start touch point is a false touch point.

Optionally, identifiers of screen point touch events recorded into the FT record array may be queried. If the identifier of the screen point touch event corresponding to the up event is included, the start touch point corresponding to the down event in the current screen point touch event is determined to be a false touch point, or otherwise, the start touch point is determined not to be a false touch point.

Step 1020: If the start touch point is determined not to be a false touch point, report the up event.

A process of reporting the up event is the same as the process of reporting the down event in step 1012, and details are not described herein again.

Step 1021: If the start touch point is determined to be a false touch point, determine whether an occurrence time difference between an end touch point and the start touch point is less than a first time threshold.

The first time threshold may be dynamically configured based on a time lasted when most users tap the touchscreen and the mobile phone application. Specifically, the first time threshold TimeLimit may make the following equation true:

$$\text{TimeLimit} = \text{TIME} + \text{application modification coefficient; or TimeLimit} = \text{TIME} * \text{application modification coefficient.}$$

Herein, TIME may be the time lasted when the most users tap the touchscreen. The application modification coefficient may be set depending on different mobile phone applications, with different mobile phone applications corresponding to different application modification coefficients.

Step 1022: If the occurrence time difference between the end touch point and the start touch point is less than the first time threshold, which indicates that the touch operation is a tap event and probably a useful touch operation, and that the start touch point is mistaken, determine that the start touch point is a useful touch point (in other words, not a false touch point), delete the identifier of the screen point touch event from the FT record array, and report the move event and the up event.

Step 1023: If it is determined that the occurrence time difference between the end touch point and the start touch point is greater than or equal to the first time threshold, determine that the start touch point still remains a false touch point, shield the up event, and delete the identifier of the screen point touch event from the FT record array to end the current screen point touch event.

In this way, based on the occurrence procedure of the screen point touch event corresponding to the edge touch operation, a touch point corresponding to each event in the procedure may be analyzed. An earlier-occurring touch point that is mistaken is corrected based on a touch status of a later-occurring touch point. This avoids accidental killing of a touch point in the edge touch operation, and improves user experience.

Figure 8:
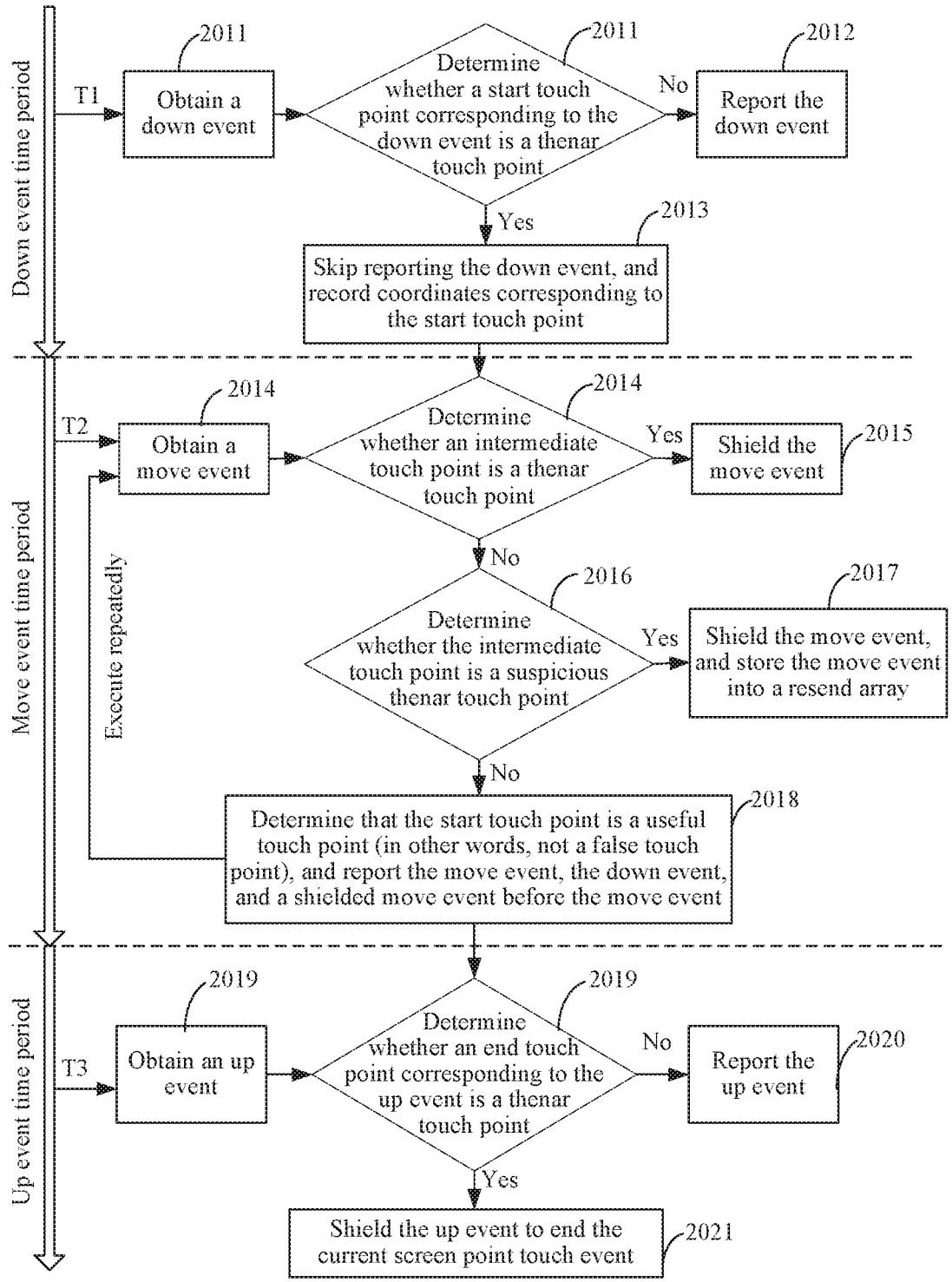
FIG. 8 is an analysis flowchart of false thenar touch prevention according to an embodiment of the present invention.

FIG. 8 is an analysis flowchart of false thenar touch prevention according to an embodiment of the present invention. As shown in FIG. 8, this may include the following steps.

Step 2011: A processor of a mobile phone obtains a down event in a screen point touch event, and determines whether a start touch point corresponding to the down event is a thenar touch point.

Optionally, if the start touch point is tangent to a longitudinal side of a touchscreen, and a length of a first tangent side is greater than a first threshold, the start touch point is determined to be a thenar touch point; or if the start touch point is tangent to both a longitudinal side and a latitudinal side of the touchscreen, and a sum of a length of a first tangent side and a length of a second tangent side is greater than a second threshold, the start touch point is determined to be a thenar touch point.

The first threshold and the second threshold may be set as required, and this is not limited in this embodiment of the present invention.

Step 2012: If the start touch point is determined not to be a thenar touch point, report the down event.

Reporting the down event may specifically include: reporting the start touch point corresponding to the down event to an application layer of the processor of the mobile phone for processing, which may include: reporting that the start touch point is a useful point (that is, a normal point), and executing original processing logic of a system. Therefore, in this embodiment of the present invention, reporting the down event may mean reporting the start touch point. Likewise, reporting a move event may mean reporting an intermediate touch point, and reporting an up event may mean reporting an end touch point.

Step 2013: If the start touch point is determined to be a thenar touch point, which indicates that the start touch point is a false touch point, skip reporting the down event, and record coordinates corresponding to the start touch point.

Step 2014: The processor of the mobile phone obtains a move event in the screen point touch event, and determines whether an intermediate touch point is a thenar touch point.

The move event may be any move event in the screen point touch event.

A process of determining whether the intermediate touch point is a thenar touch point in step 2014 is the same as the process of determining whether the start touch point is a thenar touch point in step 2011, and details are not repeated described herein.

Step 2015: If the intermediate touch point is determined to be a thenar touch point, which indicates that determining that the start touch point is a false touch point is correct, shield the move event without using a regret mechanism.

Step 2016: If the intermediate touch point is determined not to be a thenar touch point, which indicates that determining that the start touch point is a thenar touch point may be incorrect, in this case, determine whether the intermediate touch point is a suspicious thenar touch point.

For example, the determining whether the intermediate touch point is a suspicious thenar touch point may include:

If the intermediate touch point is tangent to the longitudinal side of the touchscreen, and the length of the first tangent side is less than or equal to the first threshold, and is greater than a suspicious point threshold, determining that the intermediate touch point is a suspicious thenar touch point.

The suspicious point threshold may be an average value of lengths of tangent sides occurring when thumbs of most users press the touchscreen.

Step 2017: If the intermediate touch point is a suspicious thenar touch point, which indicates that determining that the start touch point is a thenar touch point is correct, shield the move event without using a regret mechanism, and store the move event into a resend array.

Step 2018: If the intermediate touch point is not a suspicious thenar touch point, which indicates that determining that the start touch point is a thenar touch point is incorrect, and that the start touch point is mistaken, determine that the start touch point is a useful touch point (in other words, not a false touch point), and report the move event, the down event, and a shielded move event before the move event.

The shielded move event before the move event may be a move event occurring earlier than the move event.

Optionally, the resend array may be searched for the shielded move event before the move event.

It should be noted that, each time when obtaining a move event, the processor of the mobile phone needs to perform steps 2014 to 2018, until the end of all move events. In other words, when receiving an up event sent by the touchscreen of the mobile phone, the processor of the mobile phone performs step 2019.

Step 2019: The processor of the mobile phone obtains an up event corresponding to the screen point touch event, and determines whether an end touch point corresponding to the up event is a thenar touch point.

Step 2020: If the end touch point is determined to be a thenar touch point, report the up event.

A process of reporting the up event is the same as the process of reporting the down event in step 2012, and details are not described herein again.

Step 2021: If the end touch point is determined not to be a thenar touch point, and shield the up event to end the current screen point touch event.

In this way, based on the occurrence procedure of the screen point touch event corresponding to the thenar touch point, a touch point corresponding to each event in the procedure may be analyzed. An earlier-occurring touch point that is mistaken is corrected based on a touch status of a later-occurring touch point. This avoids accidental killing of a touch point in a thenar operation, and improves user experience.

Figure 9A:
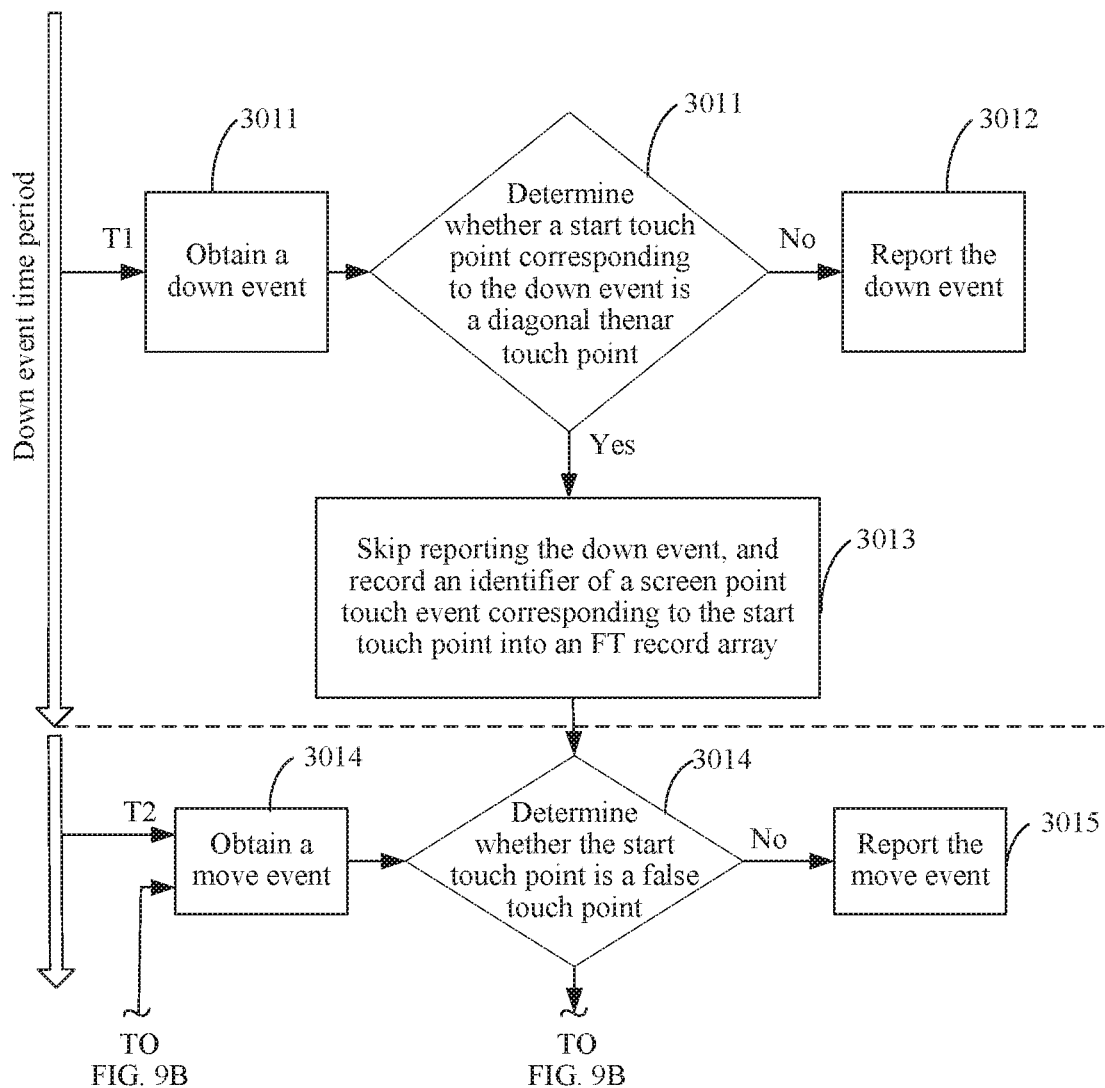
FIG. 9A to FIG. 9C are an analysis flowchart of false diagonal touch prevention according to an embodiment of the present invention.
Figure 9B:
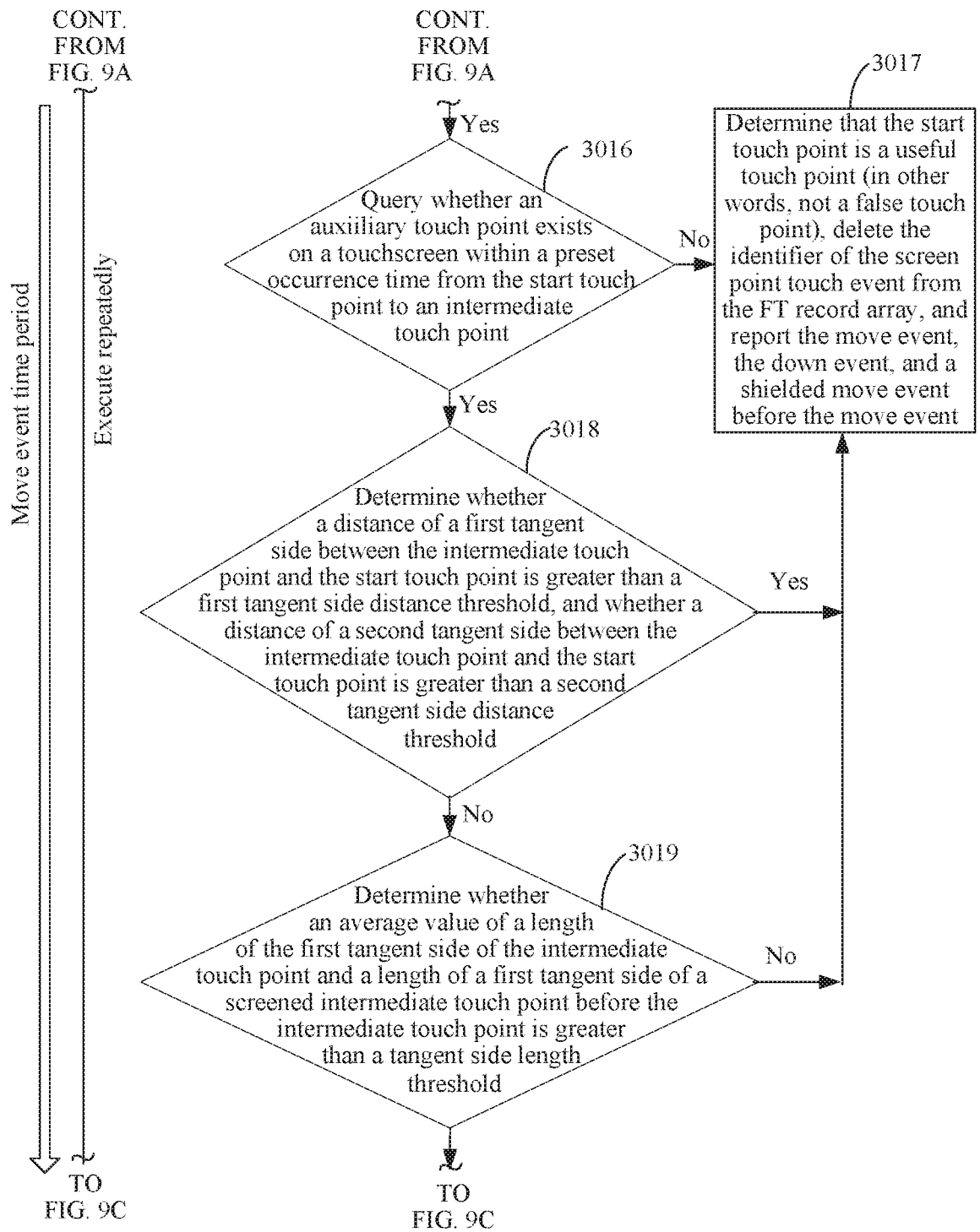
Figure 9C:
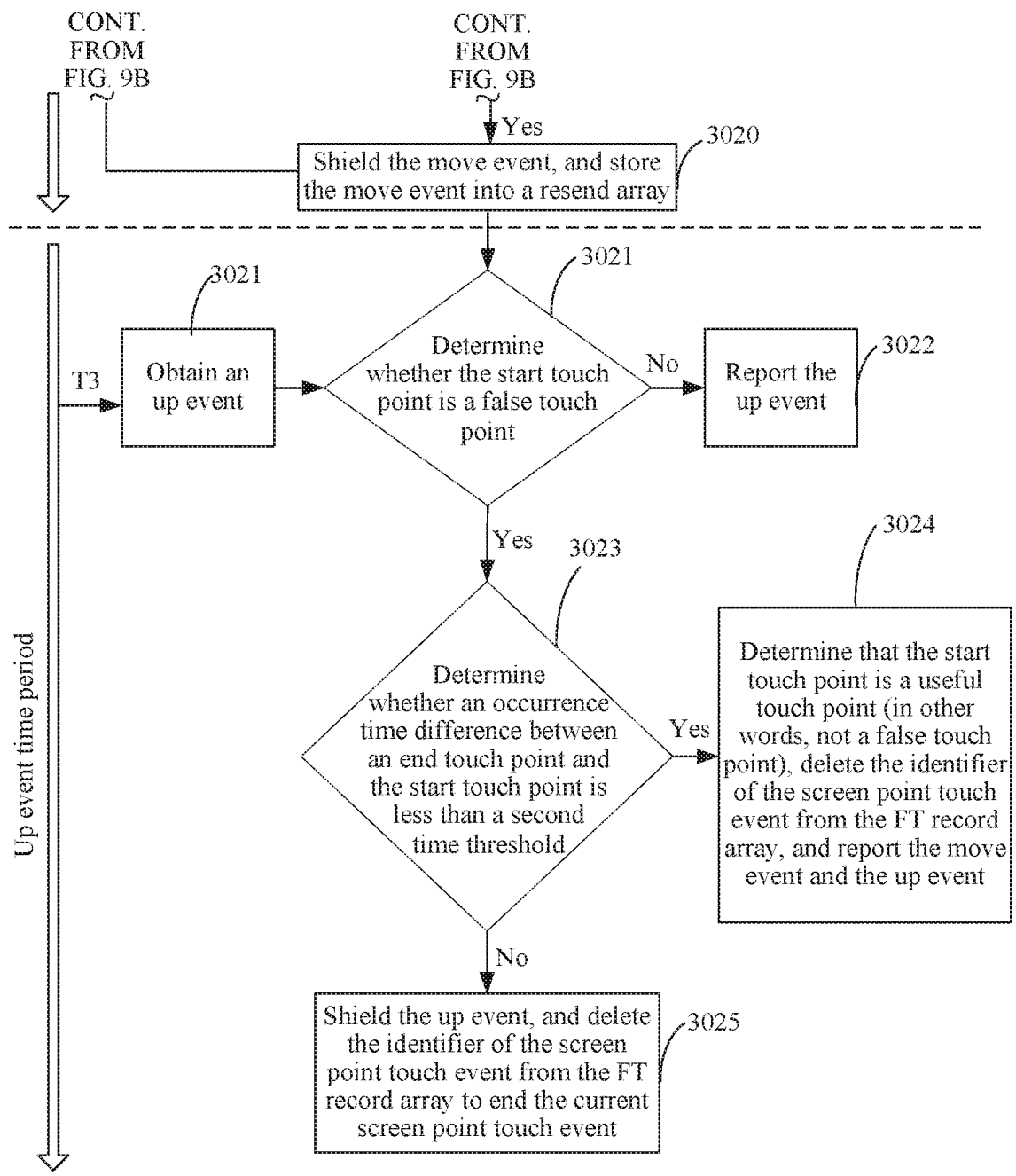

FIG. 9A to FIG. 9C are an analysis flowchart of false diagonal touch prevention according to an embodiment of the present invention. As shown in FIG. 9A to FIG. 9C, this may include the following steps.

Step 3011: A processor of a mobile phone obtains a down event in a screen point touch event, and determines whether a start touch point corresponding to the down event is a diagonal thenar touch point.

Optionally, if the start touch point is tangent to both a longitudinal side and a latitudinal side of a touchscreen, and a sum of a length of a first tangent side and a length of a second tangent side is greater than a diagonal thenar region threshold, the start touch point is determined to be a diagonal thenar touch point.

The diagonal thenar region threshold L may be dynamically configured based on a size of a current touch point and a mobile phone application. Specifically, L may make the following equation true:

$L$=Func(Lenth)+application modification coefficient, or Side$L$=Func(Lenth)*application modification coefficient.

Herein, Lenth is a length of a tangent side of the touch point that is currently detected whether the touch point is an edge touch point. Generally, the tangent side may be a tangent side obtained when a touch shape of the touch point is tangent to the longitudinal side of the touchscreen. Func (Lenth) is a function whose variable is the length of the tangent side. The application modification coefficient may be set depending on different mobile phone applications, with different mobile phone applications corresponding to different application modification coefficients.

Step 3012: If the start touch point is determined not to be a diagonal thenar touch point, report the down event.

Reporting the down event may specifically include: reporting the start touch point corresponding to the down event to an application layer of the processor of the mobile phone for processing, which may include: reporting that the start touch point is a useful point (that is, a normal point), and executing original processing logic of a system. Therefore, in this embodiment of the present invention, reporting the down event may mean reporting the start touch point. Likewise, reporting a move event may mean reporting an intermediate touch point, and reporting an up event may mean reporting an end touch point.

Step 3013: If the start touch point is determined to be a diagonal thenar touch point, which indicates that the start touch point is a false touch point, skip reporting the down event, and record an identifier of the screen point touch event corresponding to the start touch point into an FT record array.

The identifier of the screen point touch event is used to identify the screen point touch event.

Optionally, an occurrence time of the start touch point, and coordinates of the start touch point may be further recorded into the FT record array.

Step 3014: The processor of the mobile phone obtains a move event in the screen point touch event, and determines whether the start touch point is a false touch point.

The move event may be any move event in the screen point touch event.

Optionally, identifiers of screen point touch events recorded into the FT record array may be queried. If the identifier of the screen point touch event corresponding to the move event is included, the start touch point corresponding to the down event in the current screen point touch event is determined to be a false touch point, or otherwise, the start touch point is determined not to be a false touch point.

Step 3015: If the start touch point is determined not to be a false touch point, report the move event.

A process of reporting the move event is the same as the process of reporting the down event in step 3012, and details are not described herein again.

Step 3016: If the start touch point is determined to be a false touch point, query whether an auxiliary touch point exists on a touchscreen within a preset occurrence time from the start touch point to an intermediate touch point.

The preset occurrence time may be set as required, and this is not limited in this embodiment of the present invention.

The auxiliary touch point may be a useful touch point on the touchscreen.

Step 3017: If no auxiliary touch point exists, determine that the start touch point is mistaken, determine that the start touch point is a useful touch point (in other words, not a false touch point), delete the identifier of the screen point touch event from the FT record array, and report the move event, the down event, and a shielded move event before the move event.

The shielded move event before the move event may be a move event occurring earlier than the move event.

Optionally, a resend (Resend) array may be searched for the shielded move event before the move event.

Step 3018: If an auxiliary touch point exists, determine whether a distance of a first tangent side between the intermediate touch point and the start touch point is greater than a first tangent side distance threshold, and whether a distance of a second tangent side between the intermediate touch point and the start touch point is greater than a second tangent side distance threshold.

The first tangent side distance threshold and the second tangent side distance threshold may be dynamically configured based on the size of the current touch point and the mobile phone application. Specifically, the first tangent side distance threshold DistanceLY may make the following equation true:

$$\text{Distance}LY=\text{Func(Lenth)}+\text{application modification coefficient, or Distance}LY=\text{Func(Lenth)}*\text{application modification coefficient}.$$

Herein, Lenth is a length of the first tangent side of the touch point that is currently detected. Func(Lenth) is a function whose variable is the length of the tangent side. The application modification coefficient may be set depending on different mobile phone applications, with different mobile phone applications corresponding to different application modification coefficients.

Likewise, the second tangent side distance threshold DistanceLX may also make the following equation true:

$$\text{Distance}LX=\text{Func(Lenth)}+\text{application modification coefficient, or Distance}LX=\text{Func(Lenth)}*\text{application modification coefficient}.$$

Herein, Lenth is a length of the second tangent side of the touch point that is currently detected. Func(Lenth) is a function whose variable is the length of the tangent side. The application modification coefficient may be set depending on different mobile phone applications, with different mobile phone applications corresponding to different application modification coefficients.

If the distance of the first tangent side between the intermediate touch point and the start touch point is greater than the first tangent side distance threshold, and the distance of the second tangent side between the intermediate touch point and the start touch point is greater than the second tangent side distance threshold, it indicates that the touch operation spans a relatively large distance and is probably a useful touch operation, and that the start touch point is mistaken, and step 3017 is performed.

Step 3019: If the distance of the first tangent side between the intermediate touch point and the start touch point is less than or equal to the first tangent side distance threshold and/or the distance of the second tangent side between the intermediate touch point and the start touch point is less than or equal to the second tangent side distance threshold, determine whether an average value of a length of the first tangent side of the intermediate touch point and a length of a first tangent side of an intermediate touch point before the intermediate touch point is greater than a tangent side length threshold.

The tangent side length threshold may be set as required, and this is not limited in this embodiment of the present invention.

Step 3020: If the average value is greater than the tangent side length threshold, shield the move event, and store the move event into a resend array.

If the average value is less than the tangent side length threshold, step 3017 is performed.

It should be noted that, each time when obtaining a move event, the processor of the mobile phone needs to perform steps 3014 to 3020, until the end of all move events. In other words, when receiving an up event sent by the touchscreen of the mobile phone, the processor of the mobile phone performs step 3021.

Step 3021: The processor of the mobile phone obtains an up event corresponding to the screen point touch event, and determines whether the start touch point is a false touch point.

Optionally, identifiers of screen point touch events recorded into the FT record array may be queried. If the identifier of the screen point touch event corresponding to the up event is included, the start touch point corresponding to the down event in the current screen point touch event is determined to be a false touch point, or otherwise, the start touch point is determined not to be a false touch point.

Step 3022: If the start touch point is determined not to be a false touch point, report the up event.

A process of reporting the up event is the same as the process of reporting the down event in step 2012, and details are not described herein again.

Step 3023: If the start touch point is determined to be a false touch point, determine whether an occurrence time difference between an end touch point and the start touch point is less than a second time threshold.

The second time threshold may be dynamically configured based on a time lasted when most users tap the touchscreen and the mobile phone application. Specifically, the second time threshold TimeLimit may make the following equation true:

TimeLimit=TIME+application modification coefficient; or TimeLimit=TIME*application modification coefficient.

Herein, TIME may be the time lasted when the most users tap the touchscreen. The application modification coefficient may be set depending on different mobile phone applications, with different mobile phone applications corresponding to different application modification coefficients.

Step 3024: If the occurrence time difference between the end touch point and the start touch point is less than the second time threshold, which indicates that the touch operation is a tap event and probably a useful touch operation, and that the start touch point is mistaken, determine that the start touch point is a useful touch point (in other words, not a false touch point), delete the identifier of the screen point touch event from the FT record array, and report the move event and the up event.

Step 3025: If it is determined that the occurrence time difference between the end touch point and the start touch point is greater than or equal to the first time threshold, determine that the start touch point still remains a false touch point, shield the up event, and delete the identifier of the screen point touch event from the FT record array to end the current screen point touch event.

In this way, based on the occurrence procedure of the screen point touch event corresponding to the diagonal thenar touch point, a touch point corresponding to each event in the procedure may be analyzed. An earlier-occurring touch point that is mistaken is corrected based on a touch status of a later-occurring touch point. This avoids accidental killing of a touch point in a diagonal thenar operation, and improves user experience.

The foregoing mainly describes the solutions provided in the embodiments of the present invention from a perspective of the terminal being a mobile phone. It may be understood that, to implement the foregoing functions, the terminal including a mobile phone includes corresponding hardware structures and/or software modules for executing the functions. Persons skilled in the art should be easily aware that, in the present invention, units and algorithm steps in the examples described with reference to the embodiments disclosed in this specification can be implemented by hardware or a combination of hardware and computer software. Whether a function is executed by hardware or by computer software driving hardware depends on particular applications and design constraint conditions of the technical solutions. Persons skilled in the art may use a different method to implement the described functions for each particular application, but it should not be considered that the implementation goes beyond the scope of the present invention.

In the embodiments of the present invention, the terminal may be divided into functional units based on the foregoing method examples. For example, the terminal may be divided into functional units in correspondence to functions, or at least two functions may be integrated into one processing unit. The integrated unit may be implemented in a form of hardware, or may be implemented in a form of a software functional unit. It should be noted that, the unit division in the embodiments of the present invention is an example and merely logical function division, and may be other division in actual implementation.

Figure 10:
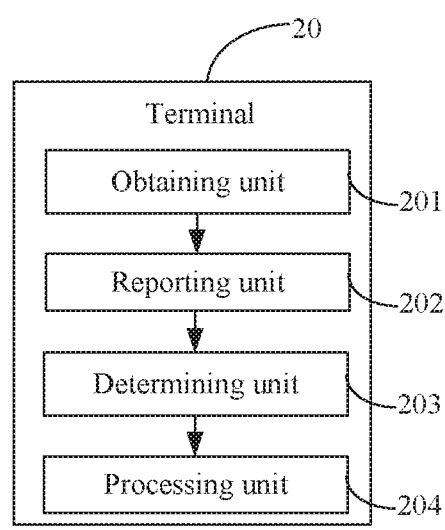
FIG. 10 is a structural diagram of another terminal 20 according to an embodiment of the present invention.

For the division into functional units in correspondence to functions, FIG. 10 is a possible schematic structural diagram of a terminal 20 used in the foregoing embodiments. The terminal 20 includes an obtaining unit 201, a reporting unit 202, a determining unit 203, and a processing unit 204. The obtaining unit 201 and the reporting unit 202 are configured to support the terminal in obtaining a touch operation performed on a touchscreen by a user, and in reporting the obtained touch operation to another unit. The determining unit 203 may be configured to support the terminal in executing a function for determining a type of the touch operation. The processing unit 204 may support the terminal 20 in executing actions in steps 104 to 106 in FIG. 5.

For using of an integrated unit, the obtaining unit 201 and the reporting unit 202 of the terminal 20 shown in FIG. 10 may be integrated into the touchscreen 101 shown in FIG. 4, and the touchscreen 101 executes actions of the obtaining unit 201 and the reporting unit 202. The determining unit 203 and the processing unit 204 may be integrated into the processor 102 shown in FIG. 4, and the processor 102 executes actions of the determining unit 203 and the processing unit 204. In addition, the determining unit 203 and the processing unit 204 may alternatively be stored, in a form of program code, in the memory 103 shown in FIG. 4, and a processor of the terminal 20 calls the program code to execute functions of the determining unit 203 and the processing unit 204.

All content of the steps in the foregoing method embodiments may be incorporated into descriptions about functions of corresponding functional units by reference, and details are not described herein again.

It may be clearly understood by persons skilled in the art that, for ease and brevity of description, for a detailed working process of the foregoing system, apparatus, and unit, reference may be made to a corresponding process in the foregoing method embodiments, and details are not described herein again. In addition, in the embodiments of the present invention, although only the mobile phone is used as an example to describe the method for false touch prevention and the terminal provided in the present invention, it may be understood that, a process of false touch prevention of another terminal and an internal structure of the another terminal are the same as those of the mobile phone, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in an actual implementation. For example, a plurality of units or components may be combined or integrated into another system, or some features may be ignored or may not be performed. In addition, the displayed or discussed mutual couplings or direct couplings or communication connections may be implemented in indirect couplings or communication connections through some interfaces, apparatuses, or units, and may be in electrical or other forms.

The units described as separated parts may or may not be physically separated. Parts displayed as units may or may not be physical units, and may be located in one location or distributed on a plurality of network devices. Some or all of the units may be selected depending on actual needs to achieve the objectives of the solutions of the embodiments.

In addition, functional units in the embodiments of the present invention may be integrated into one processing unit, or each of the functional units may exist alone, or two or more units are integrated into one unit. The integrated unit may be implemented in a form of hardware, or may be implemented in a form of a combination of hardware and a software functional unit.

Finally, it should be noted that, the foregoing embodiments are merely intended to describe the technical solutions of the present invention, but not to limit the present invention. Although the present invention is described in detail with reference to the foregoing embodiments, persons of ordinary skill in the art should understand that they may still make modifications to the technical solutions described in the foregoing embodiments or make equivalent displacements to some technical features thereof, without departing from the scope of the claims.

What is claimed is:

1. A method for touchscreen input correction, wherein the method comprises:
   determining a type of a touch operation performed on the touchscreen by a user;
   when the touch operation is a doubtful touch operation, generating a corrected false touch point by correcting a false touch point in the doubtful touch operation based on a preset determining policy and an occurrence process of a screen point touch event in the doubtful touch operation, wherein the screen point touch event comprises one of a down event or at least one move event, and wherein generating a corrected false touch point comprises:
      obtaining the down event in the screen point touch event;
      determining that a start touch point corresponding to the down event is an edge touch point;
      determining that the start touch point is the false touch point in response to the determining that the start touch point corresponding to the down event is the edge touch point;
      obtaining any one of the at least one move event in the screen point touch event;
      determining that a distance between an intermediate touch point corresponding to the at least one move event and the start touch point is greater than a first distance threshold; and
      determining that the start touch point is not the false touch point based on the determining that the distance is greater than the first distance threshold;
   reporting the start touch point, the intermediate touch point, and a shielded intermediate touch point before the intermediate touch point; and
   reporting the corrected false touch point.

2. The method of claim 1, comprising:
   shielding the touch operation without performing a process in response to determining that the touch operation is a false touch operation; and
   executing an application corresponding to the touch operation in response to the determining that the touch operation is a useful touch operation.

3. The method of claim 1, wherein the screen point touch event further comprises an up event, and wherein the method further comprises:
   obtaining the up event in the screen point touch event;
   determining whether an occurrence time difference between an end touch point corresponding to the up event and the start touch point is less than a first time threshold in response to the determining that the start touch point is the false touch point;
   determining that the start touch point is not the false touch point in response to the determining that the occurrence time difference is less than the first time threshold; and
   reporting the start touch point and the end touch point.

4. The method of claim 1, wherein the screen point touch event comprises one of a down event or at least one move event, and wherein correcting the false touch point in the doubtful touch operation and reporting the corrected false touch point comprises:
   obtaining the down event in the screen point touch event;
   determining that a start touch point corresponding to the down event is a diagonal thenar touch point;
   determining that the start touch point is the false touch point in response to the determining that the start touch point corresponding to the down event is the diagonal thenar touch point;
   obtaining any one of the at least one move event in the screen point touch event;
   querying whether an auxiliary touch point exists on the touchscreen within an occurrence time from the start touch point to a first intermediate touch point corresponding to the at least one move event;
   determining that the start touch point is not the false touch point, and reporting the start touch point, the first intermediate touch point, and a shielded intermediate touch point before the first intermediate touch point in response to not obtaining the auxiliary touch point;
   determining that a distance of a first tangent side between the first intermediate touch point and the start touch point is greater than a first tangent side distance threshold and that a distance of a second tangent side between the first intermediate touch point and the start touch point is greater than a second tangent side distance threshold in response to obtaining the auxiliary touch point;
   determining that the start touch point is not the false touch point, and reporting the start touch point, the first intermediate touch point, and the shielded intermediate touch point before the first intermediate touch point in response to the determining that the distance of the first tangent side is greater than the first tangent side distance threshold and that the distance of the second tangent side is greater than the second tangent side distance threshold;

determining whether an average value of a length of the first tangent side of the first intermediate touch point and a length of a first tangent side of a second intermediate touch point before the first intermediate touch point is greater than a tangent side length threshold in response to the determining that the distance of the first tangent side is less than or equal to the first tangent side distance threshold and that the distance of the second tangent side is less than or equal to the second tangent side distance threshold;

determining that the start touch point is the false touch point in response to the determining that the average value is greater than the tangent side length threshold; and determining that the start touch point is not the false touch point, and reporting the start touch point, the first intermediate touch point, and the shielded intermediate touch point before the first intermediate touch point in response to the determining that the average value is less than or equal to the tangent side length threshold.

5. The method of claim 4, wherein the screen point touch event further comprises an up event, and wherein the method further comprises:

obtaining the up event in the screen point touch event;

determining whether an occurrence time difference between an end touch point corresponding to the up event and the start touch point is less than a second time threshold in response to the determining that the start touch point is the false touch point; and determining that the start touch point is not the false touch point, and reporting the start touch point and the end touch point in response to the determining that the occurrence time difference is less than the second time threshold.

6. The method of claim 1, wherein the screen point touch event comprises one of a down event or at least one move event, and wherein correcting the false touch point in the doubtful touch operation and reporting the corrected false touch point comprises:

obtaining the down event in the screen point touch event;

determining a start touch point corresponding to the down event is a thenar touch point;

determining that the start touch point is the false touch point in response to the determining that the start touch point corresponding to the down event is the thenar touch point;

obtaining any one of the at least one move event in the screen point touch event;

determining whether an intermediate touch point corresponding to the at least one move event is the thenar touch point;

determining whether the intermediate touch point is a suspicious thenar touch point in response to the determining that the intermediate touch point is not the thenar touch point;

determining that the start touch point is not the false touch point in response to the determining that the intermediate touch point is not the suspicious thenar touch point; and reporting the start touch point, the intermediate touch point, and a shielded intermediate touch point before the intermediate touch point.

7. The method of claim 6, wherein the screen point touch event further comprises an up event, and wherein the method further comprises:

obtaining the up event in the screen point touch event;

determining whether an end touch point corresponding to the up event is the thenar touch point; and reporting the end touch point in response to the determining that the end touch point is not the thenar touch point.

8. The method of claim 1, wherein determining the type of the touch operation comprises:

obtaining a start touch point with which the user starts to touch the touchscreen; and determining, based on a touch shape of the start touch point or coordinates of the start touch point, the type of the touch operation performed by the user on the touchscreen.

9. The method of claim 8, wherein determining the type of the touch operation comprises:

determining that the touch operation is a false touch operation in response to the determining that the touch shape of the start touch point is tangent to a first side of the touchscreen and a length of a tangent side is greater than or equal to a first threshold;

determining that the touch operation is the false touch operation in response to the determining that the touch shape of the start touch point is tangent to both the first side and a second side of the touchscreen and a sum of a length of a first tangent side and a length of a second tangent side is greater than or equal to a second threshold, wherein the length of the first tangent side is greater than the length of the second tangent side; and determining that the touch operation is the false touch operation in response to the determining that the coordinates of the start touch point are within a false touch region.

10. The method of claim 8, wherein determining the type of the touch operation comprises:

determining that the touch operation is a useful touch operation in response to the determining that the touch shape of the start touch point is not tangent to a side of the touchscreen; and determining that the touch operation is the useful touch operation in response to the determining that the coordinates of the start touch point are within a valid touch region.

11. The method of claim 8, wherein determining the type of the touch operation comprises:

determining that the touch operation is the doubtful touch operation in response to the determining that the touch shape of the start touch point is tangent to a first side of the touchscreen, and a length of a tangent side is less than a first threshold;

determining that the touch operation is the doubtful touch operation in response to the determining that the touch shape of the start touch point is tangent to both the first side and a second side of the touchscreen, and a and a sum of a length of a first tangent side and a length of a second tangent side is less than a second threshold, wherein the first tangent side is a side obtained after the touch shape of the start touch point is tangent to the first side, and wherein the second tangent side is a side obtained after the touch shape of the start touch point is tangent to the second side;

determining that the touch operation is the doubtful touch operation in response to the determining, based on the start touch point, that the user is holding the terminal with one hand based on the start touch point;

determining that the touch operation is the doubtful touch operation in response to the determining that an operation corresponding to the start touch point is a thenar touch operation; and determining that the touch operation is the doubtful touch operation in response to the determining that the operation corresponding to the start touch point is a diagonal thenar touch operation.

12. A terminal, comprising:
a touchscreen configured to:
obtain a touch operation performed on the touchscreen by a user; and
report the touch operation; and
a processor coupled to the touchscreen and configured to:
receive the touch operation from the touchscreen;
determine a type of the touch operation;
when the touch operation is a doubtful touch operation, generate a corrected false touch point by correcting a false touch point in the doubtful touch operation based on a preset determining policy and an occurrence process of a screen point touch event in the doubtful touch operation, wherein the screen point touch event comprises at least one of a down event, at least one move event, or an up event, and wherein the touchscreen is further configured to:
obtain the down event; and
report the down event to the processor,
wherein the processor is further configured to:
receive the down event from the touchscreen; and
determine that a start touch point is the false touch point when the start touch point corresponding to the down event is an edge touch point,
wherein the touchscreen is further configured to:
obtain any one of the at least one move event in the screen point touch event; and
report the at least one move event to the processor, and
wherein the processor is further configured to:
receive the at least one move event from the touchscreen;
determine whether a distance between an intermediate touch point corresponding to the at least one move event and the start touch point is greater than a first distance threshold;
determine that the start touch point is not the false touch point when the distance is greater than the first distance threshold;
report the start touch point, the intermediate touch point, and a shielded intermediate touch point before the intermediate touch point; and
report the corrected false touch point.

13. The terminal of claim 12, wherein the processor is further configured to:
shield the touch operation without performing a process when the touch operation is a false touch operation; and
execute an application corresponding to the touch operation when the touch operation is a useful touch operation.

14. The terminal of claim 12, wherein the touchscreen is further configured to:
obtain the up event; and
report the up event to the processor,
wherein the processor is further configured to:
receive the up event from the touchscreen;

determine whether an occurrence time difference between an end touch point corresponding to the up event and the start touch point is greater than a first time threshold when the start touch point is the false touch point;

determine that the start touch point is not the false touch point when the occurrence time difference is greater than the first time threshold; and report the start touch point and the end touch point.

15. The terminal of claim 12, wherein the touchscreen is further configured to:
obtain a start touch point with which the user starts to touch the touchscreen; and
report the start touch point to the processor, and
wherein the processor is further configured to:
receive the start touch point from the touchscreen; and
determine, based on a touch shape of the start touch point or coordinates of the start touch point, the type of the touch operation performed on the touchscreen by the user.

16. The terminal of claim 15, wherein the processor is further configured to:
determine that the touch operation is a false touch operation when the touch shape of the start touch point is tangent to a first side of the touchscreen and a length of a tangent side is greater than or equal to a first threshold;
determine that the touch operation is the false touch operation when the touch shape of the start touch point is tangent to both the first side and a second side of the touchscreen and a sum of a length of a first tangent side and a length of a second tangent side is greater than or equal to a second threshold, wherein the length of the first tangent side is greater than the length of the second tangent side; and
determine that the touch operation is the false touch operation when the coordinates of the start touch point are within a false touch region.

17. The terminal of claim 15, wherein the processor is further configured to:
determine that the touch operation is a useful touch operation when the touch shape of the start touch point is not tangent to a side of the touchscreen; and
determine that the touch operation is the useful touch operation when the coordinates of the start touch point are within a valid touch region.

18. The terminal of claim 15, wherein the processor is further configured to:
determine that the touch operation is the doubtful touch operation when the touch shape of the start touch point is tangent to a first side of the touchscreen and a length of a tangent side is less than a first threshold;
determine that the touch operation is the doubtful touch operation when the touch shape of the start touch point is tangent to both the first side and a second side of the touchscreen and a sum of a length of a first tangent side and a length of a second tangent side is less than a second threshold, wherein the first tangent side is a side obtained after the touch shape of the start touch point is tangent to the first side, and wherein the second tangent side is a side obtained after the touch shape of the start touch point is tangent to the second side;
determine, based on the start touch point, that the touch operation is the doubtful touch operation when the user is holding the terminal with one hand;

determine that the touch operation is the doubtful touch operation when an operation corresponding to the start touch point is a thenar touch operation; and determine that the touch operation is the doubtful touch operation when the operation corresponding to the start touch point is a diagonal thenar touch operation.

19. The terminal of claim 15, wherein when the screen point touch event comprises one of a down event or at least one move event, the processor is further configured to:

obtain the down event in the screen point touch event;

determine a start touch point corresponding to the down event is a thenar touch point;

determine that the start touch point is the false touch point in response to determining that the start touch point corresponding to the down event is the thenar touch point;

obtain any one of the at least one move event in the screen point touch event;

determine whether an intermediate touch point corresponding to the at least one move event is the thenar touch point;

determine whether the intermediate touch point is a suspicious thenar touch point in response to determining that the intermediate touch point is not the thenar touch point;

determine that the start touch point is not the false touch point in response to determining that the intermediate touch point is not the suspicious thenar touch point; and report the start touch point, the intermediate touch point, and a shielded intermediate touch point before the intermediate touch point.

20. The terminal of claim 19, wherein the screen point touch event further comprises an up event, and wherein the processor is further configured to:

obtain the up event in the screen point touch event;

determine whether an end touch point corresponding to the up event is the thenar touch point; and report the end touch point in response to determining that the end touch point is not the thenar touch point.

* * * * *

UNITED STATES PATENT AND TRADEMARK OFFICE
CERTIFICATE OF CORRECTION

PATENT NO. : 10,955,980 B2
APPLICATION NO. : 16/343305
DATED : March 23, 2021
INVENTOR(S) : Hao Chen et al.

Page 1 of 1

It is certified that error appears in the above-identified patent and that said Letters Patent is hereby corrected as shown below:

Claim 11, Column 36, Line 58 and 59: "of the touchscreen, and a and a sum" should read "of the touchscreen and a sum"

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*